US008353751B2

(12) United States Patent

Bickley et al.

(10) Patent No.: US 8,353,751 B2

(45) Date of Patent: Jan. 15, 2013

(54) GAMING DEVICE AND METHOD FOR PROVIDING MULTIPLE-HAND POKER GAME

(75) Inventors: Jeffery S. Bickley, Reno, NV (US); Mark C. Nicely, Daly City, CA (US); Damien C. Ennis, Reno, NV (US)

(73) Assignee: IGT, Reno, NV (US)

( * ) Notice: Subject to any disclaimer, the term of this patent is extended or adjusted under 35 U.S.C. 154(b) by 1118 days.

(21) Appl. No.: 11/733,470

(22) Filed: Apr. 10, 2007

(65) Prior Publication Data

US 2008/0252011 A1 Oct. 16, 2008

(51) Int. Cl.
*A63F 13/00* (2006.01)

(52) U.S. Cl. ................................ 463/11; 463/9; 463/10

(58) Field of Classification Search .................... 463/10, 463/11, 12, 13; 273/292

See application file for complete search history.

(56) References Cited

U.S. PATENT DOCUMENTS

| | | | |
|---|---|---|---|
| 2,743,108 | A | 4/1956 | Sanders |
| 3,904,207 | A | 9/1975 | Gold |
| 4,363,485 | A | 12/1982 | Edwall |
| 4,582,324 | A | 4/1986 | Koza et al. |
| 4,618,150 | A | 10/1986 | Kimura |
| 4,652,998 | A | 3/1987 | Koza et al. |
| 4,659,087 | A | 4/1987 | Shen et al. |
| 4,695,053 | A | 9/1987 | Vazquez, Jr. et al. |
| 4,743,022 | A | 5/1988 | Wood |
| 4,775,155 | A | 10/1988 | Lees |
| 4,807,884 | A | 2/1989 | Breeding |
| 4,836,553 | A | 6/1989 | Suttle et al. |
| 4,844,464 | A | 7/1989 | Berge |
| 4,861,041 | A | 8/1989 | Jones et al. |
| 5,019,973 | A | 5/1991 | Wilcox et al. |
| 5,033,744 | A | 7/1991 | Bridgeman et al. |
| 5,087,405 | A | 2/1992 | Maker |
| 5,098,107 | A | 3/1992 | Boylan et al. |
| 5,116,055 | A | 5/1992 | Tracy |
| 5,154,429 | A | 10/1992 | LeVasseur |

(Continued)

FOREIGN PATENT DOCUMENTS

EP 0 449 433 10/1991

(Continued)

OTHER PUBLICATIONS

Advantage Casino System Bonusing Brochure, written by IGT, available prior to Dec. 17, 2004.

(Continued)

*Primary Examiner* — Paul A. D'Agostino
*Assistant Examiner* — Ankit Doshi
(74) *Attorney, Agent, or Firm* — Neal, Gerber & Eisenberg LLP

(57) ABSTRACT

A gaming device having a multi-player poker game includes a plurality of two-card hands dealt to a player and to a virtual opponent. First, the player has an option to place a wager on or fold each of the player hands. Then, the gaming device folds a number of dealer hands corresponding to the number of folded player hands and contributes a wager to the pot for each remaining virtual opponent hand in play. A primary award is provided if at least one of the active player hands outranks all of the non-folded virtual opponent hands. A bonus award is provided to the player if the rank of the player's winning hand is a predetermined rank.

40 Claims, 13 Drawing Sheets

U.S. PATENT DOCUMENTS 5,174,579 A 12/1992 Griffiths
5,205,555 A 4/1993 Hamano
5,248,142 A 9/1993 Breeding
5,275,400 A 1/1994 Weingardt et al.
5,275,416 A 1/1994 Schorr et al.
5,280,909 A 1/1994 Tracy
5,288,077 A 2/1994 Jones
5,288,081 A 2/1994 Breeding
5,292,127 A 3/1994 Kelly et al.
5,334,836 A 8/1994 Filo
5,342,047 A 8/1994 Heidel et al.
5,342,049 A 8/1994 Wichinsky et al.
5,344,144 A 9/1994 Canon
5,356,140 A 10/1994 Dabrowski et al.
5,362,053 A 11/1994 Miller
5,364,105 A 11/1994 Jones
5,377,973 A 1/1995 Jones et al.
5,377,993 A 1/1995 Josephs
5,390,934 A 2/1995 Grassa
5,393,057 A 2/1995 Marnell, II
5,393,067 A 2/1995 Paulsen et al.
5,407,200 A 4/1995 Zalabah
5,411,271 A 5/1995 Mirando
5,417,430 A 5/1995 Breeding
5,431,407 A 7/1995 Hofberg et al.
5,452,899 A 9/1995 Skratulia et al.
5,454,570 A 10/1995 Karal
5,476,259 A 12/1995 Weingardt
5,494,296 A 2/1996 Grassa
5,529,309 A 6/1996 Bartlett
5,531,440 A 7/1996 Dabrowski et al.
5,531,441 A 7/1996 Dabrowski et al.
5,536,016 A 7/1996 Thompson
5,542,669 A 8/1996 Charron et al.
5,560,603 A 10/1996 Seelig et al.
5,570,885 A 11/1996 Ornstein
5,577,731 A 11/1996 Jones
5,584,485 A 12/1996 Jones et al.
5,584,763 A 12/1996 Kelly et al.
5,597,162 A 1/1997 Franklin
5,611,730 A 3/1997 Weiss
5,615,888 A 4/1997 Lofink et al.
5,626,341 A 5/1997 Jones et al.
5,632,485 A 5/1997 Woodland et al.
5,636,842 A 6/1997 Cabot et al.
5,639,088 A 6/1997 Schneider et al.
5,639,089 A 6/1997 Matsumoto et al.
5,641,730 A 6/1997 Brown
5,645,486 A 7/1997 Nagao et al.
5,649,705 A 7/1997 String
5,651,548 A 7/1997 French et al.
5,660,391 A 8/1997 Klasee
5,660,393 A 8/1997 Dreger
5,664,781 A 9/1997 Feola
5,673,917 A 10/1997 Vancura
5,678,821 A 10/1997 Hedman
5,685,774 A 11/1997 Webb
5,718,430 A 2/1998 Aramapakul et al.
5,720,483 A 2/1998 Trinh
5,735,742 A 4/1998 French
5,743,523 A 4/1998 Kelly et al.
5,755,619 A 5/1998 Matsumoto et al.
5,769,716 A 6/1998 Saffari et al.
5,772,506 A 6/1998 Marks et al.
5,781,647 A 7/1998 Fishbine et al.
5,788,573 A 8/1998 Baerlocher et al.
5,788,574 A 8/1998 Ornstein et al.
5,794,964 A 8/1998 Jones et al.
5,795,225 A 8/1998 Jones et al.
5,806,846 A 9/1998 Lofink et al.
5,816,575 A 10/1998 Keller
5,823,873 A 10/1998 Moody
5,823,874 A 10/1998 Adams
5,830,063 A 11/1998 Byrne
5,833,536 A 11/1998 Davids et al.
5,833,537 A 11/1998 Barrie
5,839,730 A 11/1998 Pike
5,845,906 A 12/1998 Wirth
5,848,932 A 12/1998 Adams
5,851,011 A 12/1998 Lott
5,851,148 A 12/1998 Brune et al.
5,855,515 A 1/1999 Pease et al.
5,857,678 A 1/1999 Coleman et al.
5,863,041 A 1/1999 Boylan et al.
5,873,781 A 2/1999 Keane
5,882,261 A 3/1999 Adams
5,890,962 A 4/1999 Takemoto
5,893,718 A 4/1999 O'Donnell
5,911,418 A 6/1999 Adams
5,911,419 A 6/1999 Delaney et al.
5,927,714 A 7/1999 Kaplan
5,935,002 A 8/1999 Falciglia
5,941,769 A 8/1999 Order
5,947,820 A 9/1999 Morro et al.
5,947,822 A 9/1999 Weiss
5,951,397 A 9/1999 Dickinson
5,957,776 A 9/1999 Hoehne
5,967,894 A 10/1999 Kinoshita et al.
5,976,016 A 11/1999 Moody et al.
5,980,384 A 11/1999 Barrie
5,984,310 A 11/1999 English
5,997,401 A 12/1999 Crawford
6,007,066 A 12/1999 Moody
6,012,719 A 1/2000 Webb
6,015,346 A 1/2000 Bennett
6,019,369 A 2/2000 Nakagawa et al.
6,039,650 A 3/2000 Hill
6,047,963 A 4/2000 Pierce et al.
6,050,895 A 4/2000 Luciano, Jr. et al.
6,056,641 A 5/2000 Webb
6,056,642 A 5/2000 Bennett
6,059,289 A 5/2000 Vancura
6,059,658 A 5/2000 Mangano et al.
6,062,981 A 5/2000 Luciano, Jr.
6,089,976 A 7/2000 Schneider et al.
6,089,978 A 7/2000 Adams
6,093,102 A 7/2000 Bennett
6,095,525 A 8/2000 Terminel
6,102,798 A 8/2000 Bennett
6,110,039 A 8/2000 Oh
6,110,041 A 8/2000 Walker et al.
6,110,043 A 8/2000 Olsen
6,120,031 A 9/2000 Adams
6,120,377 A 9/2000 McGinnis, Sr. et al.
6,126,541 A 10/2000 Fuchs
6,126,542 A 10/2000 Fier
6,126,547 A 10/2000 Ishimoto
6,131,908 A 10/2000 Palmer
6,135,884 A 10/2000 Hedrick et al.
6,135,885 A 10/2000 Lermusiaux
6,139,013 A 10/2000 Pierce et al.
6,142,873 A 11/2000 Weiss et al.
6,142,874 A 11/2000 Kodachi et al.
6,146,273 A 11/2000 Olsen
6,155,925 A 12/2000 Giobbi et al.
6,159,095 A 12/2000 Frohm et al.
6,159,096 A 12/2000 Yoseloff
6,159,097 A 12/2000 Gura
6,159,098 A 12/2000 Slomiany et al.
6,165,069 A 12/2000 Sines et al.
6,165,070 A 12/2000 Nolte et al.
6,174,233 B1 1/2001 Sunaga et al.
6,174,235 B1 1/2001 Walker et al.
6,179,291 B1 1/2001 Vancura
6,186,894 B1 2/2001 Mayeroff
6,190,255 B1 2/2001 Thomas et al.
6,203,010 B1 3/2001 Jorasch et al.
6,210,279 B1 4/2001 Dickinson
6,220,593 B1 4/2001 Pierce et al.
6,220,961 B1 4/2001 Keane et al.
6,224,482 B1 5/2001 Bennett
6,224,484 B1 5/2001 Okuda et al.
6,227,969 B1 5/2001 Yoseloff
6,231,442 B1 5/2001 Mayeroff
6,231,445 B1 5/2001 Acres
6,234,897 B1 5/2001 Frohm et al.
6,237,917 B1 5/2001 Timpano

| | | | |
|---|---|---|---|
| 6,238,288 | B1 | 5/2001 | Walker et al. |
| 6,261,177 | B1 | 7/2001 | Bennett |
| 6,267,669 | B1 | 7/2001 | Luciano, Jr. et al. |
| 6,270,409 | B1 | 8/2001 | Shuster |
| 6,270,412 | B1 | 8/2001 | Crawford et al. |
| 6,293,866 | B1 | 9/2001 | Walker et al. |
| 6,299,536 | B1 | 10/2001 | Hill |
| 6,305,686 | B1 | 10/2001 | Perrie et al. |
| 6,309,298 | B1 | 10/2001 | Gerow |
| 6,309,299 | B1 | 10/2001 | Weiss |
| 6,312,330 | B1 | 11/2001 | Jones et al. |
| 6,312,334 | B1 | 11/2001 | Yoseloff |
| 6,313,871 | B1 | 11/2001 | Schubert |
| 6,334,814 | B1 | 1/2002 | Adams |
| 6,336,859 | B2 | 1/2002 | Jones et al. |
| 6,336,862 | B1 | 1/2002 | Byrne |
| 6,345,824 | B1 | 2/2002 | Selitzky |
| 6,346,044 | B1 | 2/2002 | McCrea, Jr. |
| 6,347,996 | B1 | 2/2002 | Gilmore et al. |
| 6,371,867 | B1 | 4/2002 | Webb |
| 6,375,189 | B1 | 4/2002 | Jones |
| 6,386,977 | B1 | 5/2002 | Hole |
| 6,398,644 | B1 | 6/2002 | Perrie et al. |
| 6,402,147 | B1 | 6/2002 | Lo |
| 6,416,409 | B1 | 7/2002 | Jordan |
| 6,419,583 | B1 | 7/2002 | Crumby et al. |
| 6,425,823 | B1 | 7/2002 | Byrne |
| 6,428,412 | B1 | 8/2002 | Anderson et al. |
| 6,435,511 | B1 | 8/2002 | Vancura et al. |
| 6,443,837 | B1 | 9/2002 | Jaffe et al. |
| 6,460,848 | B1 | 10/2002 | Soltys et al. |
| 6,461,240 | B1 | 10/2002 | Perkins |
| 6,461,241 | B1 | 10/2002 | Webb et al. |
| 6,464,582 | B1 | 10/2002 | Baerlocher et al. |
| 6,471,591 | B1 | 10/2002 | Crumby |
| 6,474,646 | B1 | 11/2002 | Webb |
| 6,475,088 | B1 | 11/2002 | Jones et al. |
| 6,481,713 | B2 | 11/2002 | Perrie et al. |
| 6,482,089 | B2 | 11/2002 | Demar et al. |
| 6,485,368 | B2 | 11/2002 | Jones et al. |
| 6,503,145 | B1 | 1/2003 | Webb |
| 6,511,068 | B1 | 1/2003 | Sklansky et al. |
| 6,514,140 | B1 | 2/2003 | Storch |
| 6,517,073 | B1 | 2/2003 | Vancura |
| 6,517,435 | B2 | 2/2003 | Soltys et al. |
| 6,523,831 | B2 | 2/2003 | Webb |
| 6,530,837 | B2 | 3/2003 | Soltys et al. |
| 6,532,291 | B1 | 3/2003 | McGrath |
| 6,533,276 | B2 | 3/2003 | Soltys et al. |
| 6,533,658 | B1 | 3/2003 | Walker et al. |
| 6,533,662 | B2 | 3/2003 | Soltys et al. |
| 6,537,150 | B1 | 3/2003 | Luciano et al. |
| 6,547,242 | B1 | 4/2003 | Sugiyama et al. |
| 6,553,276 | B2 | 4/2003 | Akram et al. |
| 6,569,015 | B1 | 5/2003 | Baerlocher et al. |
| 6,572,471 | B1 | 6/2003 | Bennett |
| 6,579,180 | B2 | 6/2003 | Soltys et al. |
| 6,607,195 | B2 | 8/2003 | Vancura |
| 6,609,711 | B1 | 8/2003 | Campbell |
| 6,645,073 | B2 | 11/2003 | Lemay et al. |
| 6,648,759 | B2 | 11/2003 | Vancura |
| 6,652,378 | B2 | 11/2003 | Cannon et al. |
| 6,656,040 | B1 | 12/2003 | Brosnan et al. |
| 6,656,047 | B1 | 12/2003 | Tarantino et al. |
| 6,672,975 | B1 | 1/2004 | Galloway |
| 6,682,419 | B2 | 1/2004 | Webb et al. |
| 6,682,420 | B2 | 1/2004 | Webb et al. |
| 6,692,003 | B2 | 2/2004 | Potter et al. |
| 6,692,355 | B2 | 2/2004 | Baerlocher et al. |
| 6,702,289 | B1 | 3/2004 | Feola |
| 6,726,427 | B2 | 4/2004 | Jarvis et al. |
| 6,733,389 | B2 | 5/2004 | Webb et al. |
| 6,749,200 | B2 | 6/2004 | Yurkins |
| 6,758,751 | B2 | 7/2004 | Soltys et al. |
| 6,772,975 | B2 | 8/2004 | Sommerfeld et al. |
| 6,776,415 | B2 | 8/2004 | Robinson et al. |
| 6,789,800 | B2 | 9/2004 | Webb |
| 6,802,773 | B2 | 10/2004 | Moody |
| 6,808,173 | B2 | 10/2004 | Snow |

| | | | |
|---|---|---|---|
| 6,827,348 | B1 | 12/2004 | Mitchell |
| 6,840,517 | B2 | 1/2005 | Snow et al. |
| 6,845,981 | B1 | 1/2005 | Ko |
| 6,848,994 | B1 | 2/2005 | Knust et al. |
| 6,857,958 | B2 | 2/2005 | Osawa |
| 6,869,074 | B2 | 3/2005 | Miller |
| 6,869,075 | B1 | 3/2005 | Stavinsky |
| 6,874,786 | B2 | 4/2005 | Bruno et al. |
| 6,877,748 | B1 | 4/2005 | Patroni et al. |
| 6,878,064 | B2 | 4/2005 | Huang |
| 6,884,168 | B2 | 4/2005 | Wood et al. |
| 6,896,620 | B1 | 5/2005 | Luciano et al. |
| 6,902,167 | B2 | 6/2005 | Webb |
| 6,923,446 | B2 | 8/2005 | Snow |
| 6,938,900 | B2 | 9/2005 | Snow |
| 7,011,309 | B2 | 3/2006 | Soltys et al. |
| 7,017,805 | B2 | 3/2006 | Meehan |
| 7,018,291 | B1 | 3/2006 | Lemke et al. |
| 7,114,718 | B2 | 10/2006 | Grauzer et al. |
| 7,137,630 | B2 | 11/2006 | Yurkins |
| 2001/0000933 | A1 | 5/2001 | Koelling |
| 2001/0035610 | A1 | 11/2001 | Webb |
| 2001/0054796 | A1 | 12/2001 | Lo |
| 2002/0028710 | A1 | 3/2002 | Ishihara et al. |
| 2002/0034974 | A1 | 3/2002 | Wood et al. |
| 2002/0042298 | A1 | 4/2002 | Soltys et al. |
| 2002/0042299 | A1 | 4/2002 | Soltys et al. |
| 2002/0045472 | A1 | 4/2002 | Adams |
| 2002/0068625 | A1 | 6/2002 | Soltys et al. |
| 2002/0072405 | A1 | 6/2002 | Soltys et al. |
| 2002/0072407 | A1 | 6/2002 | Soltys et al. |
| 2002/0094855 | A1 | 7/2002 | Berman |
| 2002/0177480 | A1 | 11/2002 | Rowe |
| 2002/0198036 | A1 | 12/2002 | Baerlocher et al. |
| 2003/0008697 | A1 * | 1/2003 | Hartl ............................... 463/11 |
| 2003/0057648 | A1 | 3/2003 | Webb |
| 2003/0064772 | A1 | 4/2003 | Tempest et al. |
| 2003/0064785 | A1 | 4/2003 | Stone et al. |
| 2003/0069064 | A1 | 4/2003 | Ainsworth |
| 2003/0071418 | A1 | 4/2003 | Saucier |
| 2003/0087696 | A1 | 5/2003 | Soltys et al. |
| 2003/0090063 | A1 * | 5/2003 | Jarvis et al. .................. 273/292 |
| 2003/0151194 | A1 | 8/2003 | Hessing et al. |
| 2003/0171142 | A1 | 9/2003 | Kaji et al. |
| 2003/0181231 | A1 | 9/2003 | Vancura et al. |
| 2003/0207709 | A1 | 11/2003 | Paotrakul |
| 2003/0207710 | A1 | 11/2003 | Rodgers et al. |
| 2003/0211884 | A1 | 11/2003 | Gauselmann |
| 2003/0236116 | A1 | 12/2003 | Marks et al. |
| 2004/0029631 | A1 | 2/2004 | Duhamel |
| 2004/0053673 | A1 | 3/2004 | Mishra |
| 2004/0053683 | A1 | 3/2004 | Hartl et al. |
| 2004/0070146 | A1 | 4/2004 | Snow |
| 2004/0072619 | A1 | 4/2004 | Brosnan et al. |
| 2004/0152509 | A1 | 8/2004 | Hornik et al. |
| 2004/0164491 | A1 | 8/2004 | Webb |
| 2004/0183256 | A1 | 9/2004 | Ko |
| 2004/0195770 | A1 | 10/2004 | Ornstein |
| 2004/0224777 | A1 | 11/2004 | Smith et al. |
| 2004/0251630 | A1 | 12/2004 | Sines et al. |
| 2005/0012273 | A1 | 1/2005 | Bruno et al. |
| 2005/0026680 | A1 | 2/2005 | Gururajan |
| 2005/0026683 | A1 | 2/2005 | Fujimoto |
| 2005/0029743 | A1 | 2/2005 | Daines |
| 2005/0040599 | A1 | 2/2005 | Snow |
| 2005/0051963 | A1 | 3/2005 | Snow |
| 2005/0054408 | A1 | 3/2005 | Steil et al. |
| 2005/0059461 | A1 | 3/2005 | Ching et al. |
| 2005/0073100 | A1 | 4/2005 | Falciglia, Sr. |
| 2005/0073102 | A1 | 4/2005 | Yoseloff et al. |
| 2005/0082758 | A1 | 4/2005 | Sklansky et al. |
| 2005/0107148 | A1 | 5/2005 | Webb |
| 2005/0116414 | A1 | 6/2005 | Yurkins |
| 2005/0119047 | A1 | 6/2005 | Olive |
| 2005/0119048 | A1 | 6/2005 | Soltys et al. |
| 2005/0143168 | A1 | 6/2005 | Torango |
| 2005/0161882 | A1 | 7/2005 | Miller |
| 2005/0164760 | A1 | 7/2005 | Moody |
| 2005/0176488 | A1 | 8/2005 | Olive |

| | | | | |
|---|---|---|---|---|
| 2005/0209004 | A1 | 9/2005 | Torango | |
| 2005/0239542 | A1 | 10/2005 | Olsen | |
| 2005/0269776 | A1 | 12/2005 | Miller | |
| 2005/0282622 | A1 | 12/2005 | Lindquist | |
| 2006/0001211 | A1 | 1/2006 | Lewis et al. | |
| 2006/0019739 | A1 | 1/2006 | Soltys et al. | |
| 2006/0027970 | A1 | 2/2006 | Kyrychenko | |
| 2006/0058082 | A1 | 3/2006 | Crawford, III et al. | |
| 2006/0058083 | A1 | 3/2006 | Crawford, III et al. | |
| 2006/0058084 | A1 | 3/2006 | Crawford, III et al. | |
| 2006/0058085 | A1 | 3/2006 | White et al. | |
| 2006/0058086 | A1 | 3/2006 | White et al. | |
| 2006/0058087 | A1 | 3/2006 | White et al. | |
| 2006/0058088 | A1 | 3/2006 | Crawford, III et al. | |
| 2006/0058089 | A1 | 3/2006 | White et al. | |
| 2006/0058090 | A1 | 3/2006 | Crawford, III et al. | |
| 2006/0058091 | A1 | 3/2006 | Crawford, III et al. | |
| 2006/0058092 | A1 | 3/2006 | Crawford, III et al. | |
| 2006/0058093 | A1 | 3/2006 | White et al. | |
| 2006/0066052 | A1 | 3/2006 | White et al. | |
| 2006/0068498 | A1 | 3/2006 | White et al. | |
| 2006/0068864 | A1 | 3/2006 | White et al. | |
| 2006/0068865 | A1 | 3/2006 | White et al. | |
| 2006/0068866 | A1 | 3/2006 | White et al. | |
| 2006/0068868 | A1 | 3/2006 | Crawford, III et al. | |
| 2006/0068869 | A1 | 3/2006 | White et al. | |
| 2006/0068870 | A1 | 3/2006 | Crawford, III et al. | |
| 2006/0068871 | A1 | 3/2006 | Crawford, III et al. | |
| 2006/0068879 | A1 | 3/2006 | Crawford, III et al. | |
| 2006/0068899 | A1 | 3/2006 | White et al. | |
| 2006/0128455 | A1 | 6/2006 | Bourbour et al. | |
| 2006/0131810 | A1* | 6/2006 | Nicely | 273/292 |
| 2006/0160600 | A1 | 7/2006 | Hill et al. | |
| 2006/0160608 | A1 | 7/2006 | Hill et al. | |
| 2006/0165254 | A1 | 7/2006 | Fujimoto et al. | |
| 2006/0177109 | A1 | 8/2006 | Storch | |
| 2006/0186598 | A1 | 8/2006 | Coussa | |
| 2006/0202422 | A1 | 9/2006 | Bahar | |
| 2006/0208423 | A1* | 9/2006 | Loewenstein et al. | 273/292 |
| 2006/0217167 | A1 | 9/2006 | Jubinville et al. | |
| 2006/0223605 | A1 | 10/2006 | Pullman | |
| 2006/0223638 | A1 | 10/2006 | Koyama et al. | |
| 2006/0252521 | A1 | 11/2006 | Gururajan et al. | |
| 2006/0252554 | A1 | 11/2006 | Gururajan et al. | |
| 2006/0258427 | A1 | 11/2006 | Rowe et al. | |
| 2006/0258442 | A1 | 11/2006 | Ryan | |
| 2006/0264252 | A1 | 11/2006 | White et al. | |
| 2006/0281513 | A1 | 12/2006 | Kirkpatrick | |
| 2006/0284376 | A1 | 12/2006 | Snow | |
| 2006/0284378 | A1 | 12/2006 | Snow et al. | |
| 2006/0287066 | A1 | 12/2006 | Crawford, III et al. | |
| 2006/0287067 | A1 | 12/2006 | White et al. | |
| 2006/0287101 | A1 | 12/2006 | Crawford, III et al. | |
| 2006/0287102 | A1 | 12/2006 | White et al. | |
| 2006/0287103 | A1 | 12/2006 | Crawford, III et al. | |
| 2006/0287104 | A1 | 12/2006 | White et al. | |
| 2006/0293099 | A1 | 12/2006 | Cooper | |
| 2007/0075494 | A1 | 4/2007 | Abbott | |
| 2007/0090600 | A1 | 4/2007 | Adam et al. | |
| 2007/0205559 | A1 | 9/2007 | Webb et al. | |
| 2008/0207297 | A1* | 8/2008 | Zilba | 463/16 |

FOREIGN PATENT DOCUMENTS

| | | | |
|---|---|---|---|
| EP | 0 874 337 | | 10/1998 |
| EP | 0 945 837 | | 9/1999 |
| EP | 0 984 408 | | 3/2000 |
| EP | 0 984 409 | | 3/2000 |
| EP | 1 469 432 | | 4/2004 |
| EP | 1 532 594 | | 11/2006 |
| GB | 2 096 376 | A | 10/1982 |
| GB | 2 097 160 | A | 10/1982 |
| GB | 2 100 905 | A | 1/1983 |
| GB | 2 117 952 | | 10/1983 |
| GB | 2 137 392 | A | 10/1984 |
| GB | 2 142 457 | A | 1/1985 |
| GB | 2 153 572 | A | 8/1985 |
| GB | 2 161 008 | A | 1/1986 |
| GB | 2 161 009 | A | 1/1986 |
| GB | 2 170 636 | A | 8/1986 |
| GB | 2 180 682 | A | 4/1987 |
| GB | 2 181 589 | A | 4/1987 |
| GB | 2 183 882 | A | 6/1987 |
| GB | 2 191 030 | | 12/1987 |
| GB | 2 222 712 | A | 3/1990 |
| GB | 2 226 907 | A | 7/1990 |
| GB | 2 408 951 | | 6/2005 |
| WO | WO 98/47115 | | 10/1998 |
| WO | WO 98/51384 | | 11/1998 |
| WO | WO 00/12186 | | 3/2000 |
| WO | WO 2004/021294 | | 3/2004 |
| WO | WO 2004/112923 | | 12/2004 |
| WO | WO 2005/009563 | | 2/2005 |
| WO | WO 2005/025696 | | 3/2005 |
| WO | WO 2005/025701 | | 3/2005 |
| WO | WO 2005/037385 | | 4/2005 |
| WO | WO 2005/043475 | | 5/2005 |
| WO | WO 2005/081958 | | 9/2005 |
| WO | WO 2005/083599 | A1 | 9/2005 |
| WO | WO 2005/099425 | A2 | 10/2005 |
| WO | WO 2005/123203 | | 12/2005 |
| WO | WO 2006/041655 | | 4/2006 |
| WO | WO 2006/106192 | | 10/2006 |
| WO | WO 2006/127128 | | 11/2006 |

OTHER PUBLICATIONS

Advantage Casino System Brochure, Mobile Data Access, written by IGT, available prior to Dec. 17, 2004.

Advantage Casino System Brochure, NexGen Interactive Touch Screen Display, written by IGT, available prior to Dec. 17, 2004.

Advantage Casino System Marketing Brochure, written by IGT, available prior to Dec. 17, 2004.

Advantage Casino System Table Touch Brochure, written by IGT, 2004.

Description of Poker written by Hoyle's Rules of Games published 1946-1983.

Mikohn Ripley's Believe It or Not Article written by Strictly Slots published in 2001.

* cited by examiner

GAMING DEVICE AND METHOD FOR PROVIDING MULTIPLE-HAND POKER GAME

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

BACKGROUND

In recent years, poker has become very popular. One of the most common variations of poker is Five Card Draw. In general, in Five Card Draw poker the player gets five cards dealt face up from a 52 card deck of playing cards. The player can discard none, one, a plurality or all of the five cards. Each discarded card is replaced with another card from the deck. After the replacement, the cards are evaluated for winning combinations. For a five card poker game, there are nine general categories of hands, ranked from highest to lowest, as shown in Table 1 below.

TABLE 1

Ranking of Five Card Poker Hands by Category

| Rank | Name | Example |
|---|---|---|
| 1 | Straight Flush | K♣Q♣J♣10♣9♣ |
| 2 | Four of a Kind | J♣J♥ J♦ J♠3♣ |
| 3 | Full House | A♥ A♦ A♣6♦ 6♠ |
| 4 | Flush | A♣J♣8♣6♣2♣ |
| 5 | Straight | 8♦ 7♣6♠5♠4♣ |
| 6 | Three of a Kind | Q♠Q♥ Q♦ 6♦ 2♠ |
| 7 | Two Pair | 8♦ 8♥ 5♥ 5♣2♠ |
| 8 | One Pair | K♦ K♠8♣7♣2♥ |
| 9 | No Pair | A♥ 10♣7♦ 5♠3♠ |

Within each category, hands are ranked according to the rank of individual cards, with an Ace being the highest card and a two being the lowest card. There is no difference in rank between the four suits of cards. All hands can be ranked in a linear ranking from highest to lowest. Because suits are all of the same value, however, there are multiple hands that have identical rankings. For example, there are four equivalent hands for each type of straight flush, four of a kind, or flush, there are over a hundred equivalent hands for each two pair variation, and there are over 1,000 equivalent hands for each type of no-pair hand.

Numerous variations of poker exist, including Five Card Draw as mentioned above, Three Card Poker, Five Card Stud, Seven Card Stud, Hold'em (also called Texas Hold'em), and Omaha (also called Omaha Hold'em). The variations in these games generally differ in the total number of cards dealt, in the manner in which cards are dealt, and in the manner and frequency in which bets are placed. Various criteria may also be used to determine the winning hand, including highest ranking hand, lowest ranking hand (Low-Ball), and where the high and low hands each win half of the pot (High-Low). In general, for poker variations that include more than five cards, the hands are determined by selecting the five cards (of the greater number of cards) that result in the highest possible five card hand ranking, as shown in Table 1 above. For example, in Texas Hold'em the best five card hand is selected from a total of seven cards.

In certain known multiplayer variations of poker, the players play against each other rather than against a dealer or house. In certain of these variations, a round of play begins when each player has placed an initial bet, called the ante, into the pot. The term pot refers to the total accumulation of antes and wagers made during a particular game. After the players have anted, each player eligible for play is dealt an initial set of cards.

The number of cards dealt depends on the particular variation of poker being played. For example, in Five Card Draw, each player is initially dealt five cards. In typical Three Card Poker games where the player plays against a dealer hand, the player is dealt a total of three cards and the dealer hand includes a total of three cards as well. In certain known Three Card Poker games, the initially dealt player hand and dealer hand are final and there is no option to replace or draw any new cards. In Texas Hold'em, Five Card Stud and Seven Card Stud, each player is initially dealt two cards. These cards are typically dealt face-down; however, depending on the game, some of the cards may be dealt face-up to the player. For example, in Five Card Stud, each player is initially dealt one card face-up and one card face-down. In Texas Hold'em, each player is initially dealt two cards face-down which are commonly referred to as the hole cards.

For certain poker variations where additional cards are dealt or where cards may be replaced, after the initial deal, a first round of wagering begins, where the players have the opportunity to place wagers. If a player places a wager, that wager must be matched (i.e., called) or raised by each player that wants to remain in the game. A raise includes matching the previous wager and increasing the total bet. A player who does not match a bet drops out of the game or folds. A round of betting ends when either every player but one has folded, or when the highest bet or raise has been called by each remaining player such that each remaining player has wagered the same amount into the pot during the round.

Depending on the variation of poker being player, each game may have only an initial wager or several rounds of wagering, where each round of wagering is generally preceded by dealing one or more cards. If two or more players remain after a particular round of wagering, either more cards are dealt, or there is a showdown, depending on the game variation being played. A showdown occurs when two or more players remain in a game after the last round of wagering has been completed for a particular round. A player wins a game of poker either by having the highest ranking hand when a showdown occurs, or by being the last remaining player in the game after all other players have dropped out or folded. At a showdown, each player displays the player's hand to the other players. If two or more players have identically ranked hands that are the highest ranking hands, the pot is split evenly between them.

Of the poker variations mentioned above, Texas Hold'em is one of the more popular versions. Texas Hold'em is generally a multi-player card game played at a live card table or via a computer-based virtual card table. In Texas Hold'em, only two players at a table make the initial bets, commonly referred to as the blinds. These blinds include a large blind and a small blind. The large blind is typically twice the value of the small blind. In a blind based game such as Texas Hold'em, all players are initially eligible to receive a hand, even if they did not place the large blind or the small blind. After the players have anted, each player eligible for play is dealt an initial set of cards. Each of the players must match the blinds, raise the blinds or fold. Texas Hold'em includes a designated number of community cards (i.e., usually five) that can be used by all of the players in combination with their hole cards. The winning hand is the resulting five card hand (of the combined seven cards) having the highest poker rank. This method of determining a winning five card hand is similar to determining a winning hand in Seven Card Stud. However, Seven Card Stud does not utilize community cards as in Texas Hold'em.

Texas Hold'em generally requires two or more players. Certain computer-based versions of the game implement virtual players that use computer heuristics to attempt to allow the virtual players to behave like actual human players.

Certain gaming establishments have an interest in being able to leverage the interest in Texas Hold'em by offering a variation of the game that can be played against the house or casino rather than against other players. This may appeal to players who are waiting to get a seat at a standard table, to those who do not believe they have the skill or bankroll to participate in a standard game, or to those players simply looking for an interesting new casino game.

Existing player versus casino games based on Texas Hold'em generally fall into a few different categories. One type of game has the player attempting to achieve a certain hand outcome relative to a pay table, with assorted betting options and/or requirements along the way. Another type of Texas Hold'em game is based on the outcome of the player's hand relative to that of the dealer's hand, with assorted betting options and/or requirements along the way. Some games offer both type of mechanisms, with the main game based on latter category and an optional side bet based on the former category.

A need exists for new and exciting variations of Texas Hold'em or other seven card poker variations, where the player is able to play in a virtual gaming environment against the house or casino.

SUMMARY

Various embodiments of the present disclosure relate to a gaming device providing a multiple-hand seven card poker game, and methods of playing and operating a seven card poker game at a gaming table or through a gaming device.

In one embodiment played through a gaming device, the player plays one or more player hands against at least two house hands. More specifically, the gaming device deals a plurality of two-card hands face-down to the player and a plurality of two-cards hands face-down as house hands or virtual opponent hands.

In an embodiment, a round of play begins and the player designates a wager amount. In this embodiment, the player does not place an initial ante but is required to place at least one wager equal to the designated wager amount on one of the player hands. However, the player may place wagers on more than one player hand or all of the player hands. After the gaming device deals the multiple player and house hands face-down, the gaming device displays a first one of the player hands to the player. The player chooses to either fold or wager on the displayed hand. If the player chooses to keep this hand, the player must place a wager on the hand equal to the designated wager amount. This amount is added to a pot. As discussed above, the pot generally represents the total accumulation of wagers made by the players in the game. In these embodiments, where a single player plays against a virtual opponent, the pot represents the total of wagers from the player and the virtual opponent. If the player chose to keep the first hand, the gaming device adds to the pot an amount equal to the designated wager amount. This contribution to the pot represents a wager by the virtual opponent on one of the house hands. Accordingly, for each hand that the player chooses to keep, the gaming device wagers on and keeps a corresponding number of the house hands.

If the player chooses to fold the first hand, the gaming device causes a corresponding hand of the virtual opponent to be folded as well. In this manner, the player has a certain amount of control over the final number of hands that the virtual opponent is able to use. For each of the remaining player hands, the gaming device sequentially reveals a player hand to the player and the player chooses to either place an additional wager on that particular hand, or fold the hand.

Upon reaching the final player hand, if the player has not yet wagered on a hand (i.e., folded all the hands), the gaming device requires the player to place a wager on the final hand equal to the designated wager amount. Also, the gaming device adds to the pot an amount equal to the designated wager amount. By requiring the player to bet on at least one hand, the minimum size of the pot for a given round of play will be twice the value of the designated wager amount.

In an alternate embodiment, the player is not required to wager on any of the hand but must instead place an ante at the beginning of the round of play. Similarly, the gaming device contributes an ante into the pot. In this embodiment, if the player chooses to fold all of the player hands, the player simply forfeits the amount of the ante. However, the player may choose to place a wager on any or all of the player hands, as discussed above.

In an embodiment, the number of initial player hands is three and the number of initial house hands is four. In this embodiment, because the gaming device is required to fold one house hand for each folded player hand, the virtual opponent will always have one more hand than the player.

After the initial wagering is completed, the gaming device reveals all of the house hands to the player. The gaming device then deals five community cards face-up. The five community cards are used by the player and the house in combination with each respective non-folded two-card hand. The final hands are determined by selecting cards out of the seven available cards for each respective hand to form the highest possible ranking five card hand. For example, if one of the player's hands include an A♥ and the K♦, and the community cards are A♠, 7♣, 10♥, J♦, and K♣, the highest ranking five card hand would be A♥A♠ K♦K♣ J♦ (i.e., two-pair and a Jack). This method of determining a best five card hand is similar to how final hands are determined in such poker variations as Seven Card Stud, and Texas Hold'em.

In one embodiment, when the five community cards are revealed, they are revealed in a sequence of three cards, one card, and one card. Although in this embodiment, the player is not able to wager after each display of cards, this simulates the dealing method in a game of Texas Hold'em and provides excitement and suspense to the player. It should be appreciated that in other embodiments, the game may include one or more wagering opportunities when the community cards are dealt in this sequence or a different sequence. In one embodiment, additional betting by the dealer is allowed after one or more community cards are dealt, requiring the player to at least match the dealer bet or fold the corresponding player hand.

In a multiplayer poker game such as Texas Hold'em, the player having the highest ranking hand wins the pot. If two or more players have equivalent highest ranking hands, these players split the pot. In the present embodiments, there is only one player (playing one or more hands) playing against one virtual opponent (playing two or more hands). Nevertheless, the highest ranking hand still wins the pot. That is, in order for the player to win, one of the final player hand or hands must be a higher rank than all of the house hands. If the player wins the round of play the gaming device provides an award to the player equal to the final value of the pot. In one embodiment, multiple equivalent high hands split the pot. In another embodiment, a casino or virtual dealer hand wins all ties against the player.

In an embodiment, if the player wins the round of play and the winning hand is a designated high ranking hand, the gaming device provides the player with a bonus award and further initiates an optional bonus game. In one embodiment, the player is required to place a wager at the initiation of the bonus game. The predetermined ranks may be high ranking hands such as a Full House, Four-Of-A-Kind, a Straight Flush, or a Royal Flush, or any other designated combination of cards. Therefore, the player is rewarded for not only winning, but winning with a very high ranking hand. In addition, the player is able to optionally participate in a bonus game, where the bonus game generally offers the player a greater statistical advantage for winning than is offered in the primary game.

In one embodiment, if the player loses the round of play and the player's losing hand is one of a plurality of predetermined ranking hands, the player wins an award such as a consolation award or bad-beat award. For example, if the player's hand is a Four-Of-A-Kind and the dealer's hand is a Straight Flush, the player loses with a very high ranking hand. Therefore, the consolation award compensates the player for what would have otherwise have been a frustrating loss. In one embodiment, the predetermined ranking hands include a Royal Flush, a Straight Flush, a Four-Of-A-Kind, and a Full House. In one embodiment, the consolation award is a progressive award. In an embodiment, in order for the player's qualifying losing hand must include both of the player's hole cards. That is, the player does not win the consolation or progressive award if the player's final hand includes four or five of the total of five community cards.

In one embodiment, the bonus game is similar to the seven card poker game that is played in the primary game. However, the player plays just one hand against one house hand and must place a secondary wager on the bonus game prior to viewing the player's hand. Therefore, the bonus game is structured as a head-to-head or one-on-one game against a single house hand. Similar to the primary game, the gaming device deals five community cards and a winner is determined. If the player wins, the gaming device provides the player with a secondary award.

In one embodiment, the player is given the option to place a side bet. If one of the player's hands achieves a certain ranking relative to a side bet pay table, irrespective of the relative ranking of this hand compared to any dealer hand, the gaming device provides the player with an award. In another embodiment, the gaming device provides the player an option to place a side bet which pays if the best hand from amongst all the active hands, including both player hands and dealer hands, achieves a certain ranking relative to a side pay table.

In certain embodiments, the casino advantage in the main game is small or negligible. In such embodiments, the game rules require the player to place a side wager of a certain size relative to the player's main game wager, in order for the player to play the game. In another embodiment, the casino takes a vig or commission on any player winnings, as is done in certain casino games such as Pai Gow Poker and for Banker bets in Baccarat.

In an embodiment, the gaming device displays a different virtual player for each of the player hands. Similarly, the gaming device displays a virtual opponent for each of the opponent or house hands. In this manner, the gaming device simulates a multi-player environment such as would be the case in a typical live poker gaming table. Therefore, even though there is a single player playing on a gaming machine, the player has the experience of playing a real poker game with a plurality of players.

The gaming device according to present disclosure provides a video-based poker game to a single player, where the player is able to play in a simulated multi-player live gaming table environment.

Additional features and advantages are described herein, and will be apparent from, the following Detailed Description and the figures.

BRIEF DESCRIPTION OF THE FIGURES

FIG. 2B is a schematic diagram of the data network that one or more of the gaming devices of the present disclosure may be connected to.

DETAILED DESCRIPTION

Figure 1A:
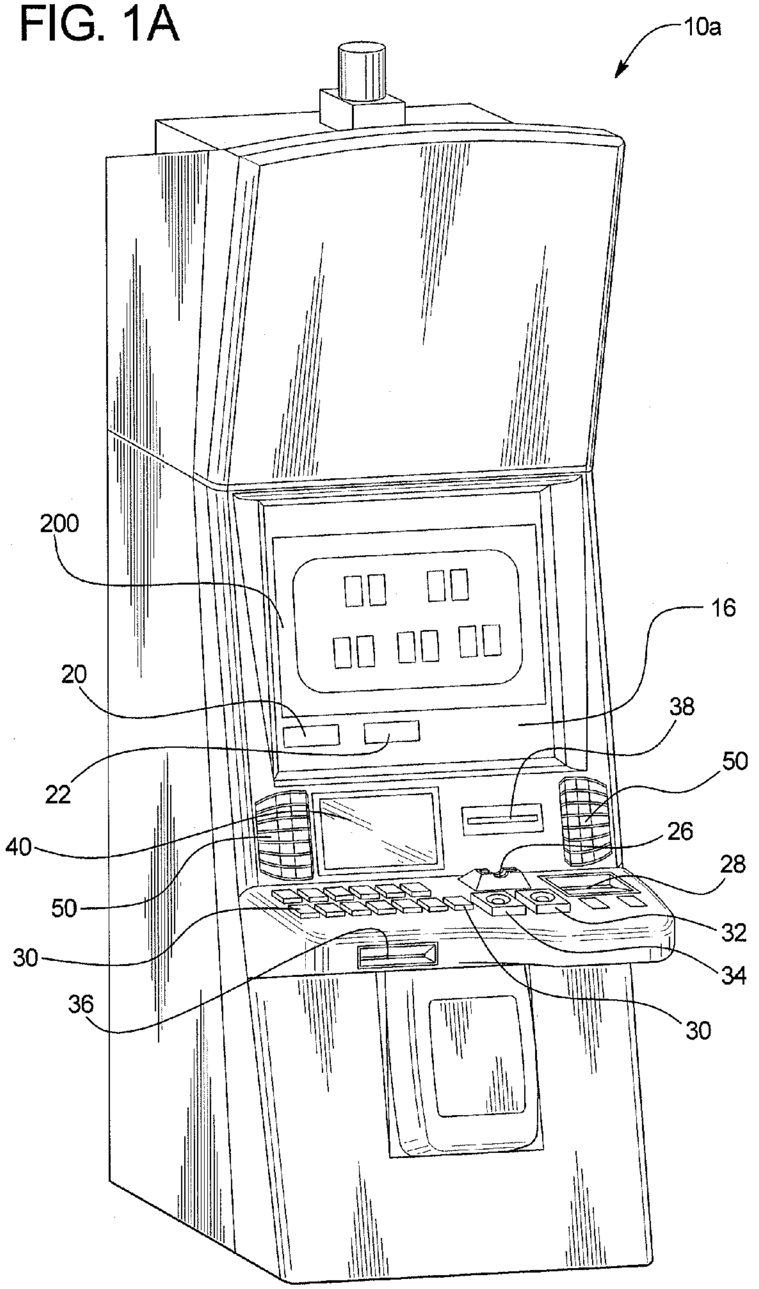
FIG. 1A is a front perspective view of one embodiment of the gaming system of the present disclosure.

The present disclosure may be implemented in various configurations for gaming machines or gaming devices, including but not limited to: (a) a casino table game, played on a physical table with physical cards dealt by a live dealer; (b) a casino table game, played on a physical table with physical cards dealt by a live dealer, with a computer that is able to determine card values and generate signals to the dealer to direct certain dealer actions; (c) a dedicated gaming machine or gaming device, wherein the computerized instructions for controlling any games (which are provided by the gaming machine or gaming device) are provided with the gaming machine or gaming device prior to delivery to a gaming establishment; and (d) a changeable gaming machine or gaming device, where the computerized instructions for controlling any games (which are provided by the gaming machine or gaming device) are downloadable to the gaming machine or gaming device through a data network when the gaming machine or gaming device is in a gaming establishment. In one embodiment, the computerized instructions for controlling any games are executed by a central server, central controller or remote host. In such a "thin client" embodiment, the central server remotely controls any games (or other suitable interfaces) and the gaming device is utilized to display such games (or suitable interfaces) and receive one or more inputs or commands from a player. In another embodiment, the computerized instructions for controlling any games are communicated from the central server, central controller or remote host to a gaming device local processor and memory devices. In such a "thick client" embodiment, the gaming device local processor executes the communicated computerized instructions to control any games (or other suitable interfaces) provided to a player.

In one embodiment, one or more gaming devices in a gaming system may be thin client gaming devices and one or more gaming devices in the gaming system may be thick client gaming devices. In another embodiment, certain functions of the gaming device are implemented in a thin client environment and certain other functions of the gaming device are implemented in a thick client environment. In one such embodiment, computerized instructions for controlling any primary games are communicated from the central server to the gaming device in a thick client configuration and computerized instructions for controlling any secondary games or bonus functions are executed by a central server in a thin client configuration.

In one embodiment, the game may be provided over a network such as the Internet. In another embodiment, the game may be provided for use on a personal digital assistant (PDA) or cellular telephone. In these embodiments, the player downloads the game to a local computing device or devices and is able to play the game in a separate location from the actual gaming establishment. In addition, in a multiplayer embodiment, several players can log on to a central server and play the game with several other players that are playing at different locations.

Figure 1B:
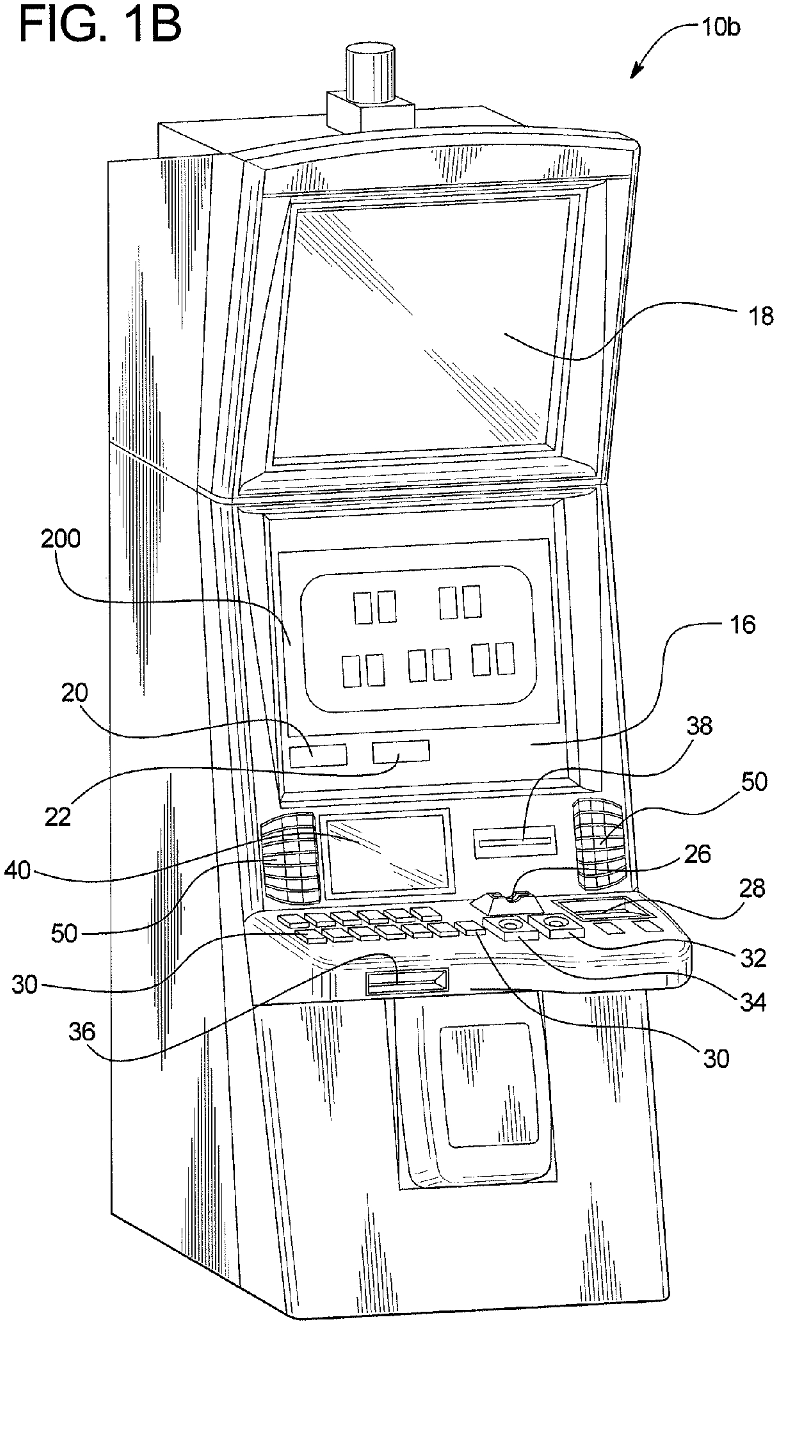
FIG. 1B is a front perspective view of one embodiment, of the gaming system of the present disclosure.

Referring now to the drawings, two example alternative embodiments of the gaming devices disclosed herein are illustrated in FIGS. 1A and 1B as gaming device 10*a* and gaming device 10*b*, respectively. Gaming device 10*a* and/or gaming device 10*b* are generally referred to herein as gaming device 10.

In the embodiments illustrated in FIGS. 1A and 1B, gaming device 10 has a support structure, housing or cabinet which provides support for a plurality of displays, inputs, controls and other features of a conventional gaming machine. It is configured so that a player can operate it while standing or sitting. The gaming device 10 may be positioned on a base or stand or can be configured as a pub-style table-top game (not shown) which a player can operate preferably while sitting. As illustrated by the different configurations shown in FIGS. 1A and 1B, the gaming device 10 may have varying cabinet and display configurations.

Figure 2A:
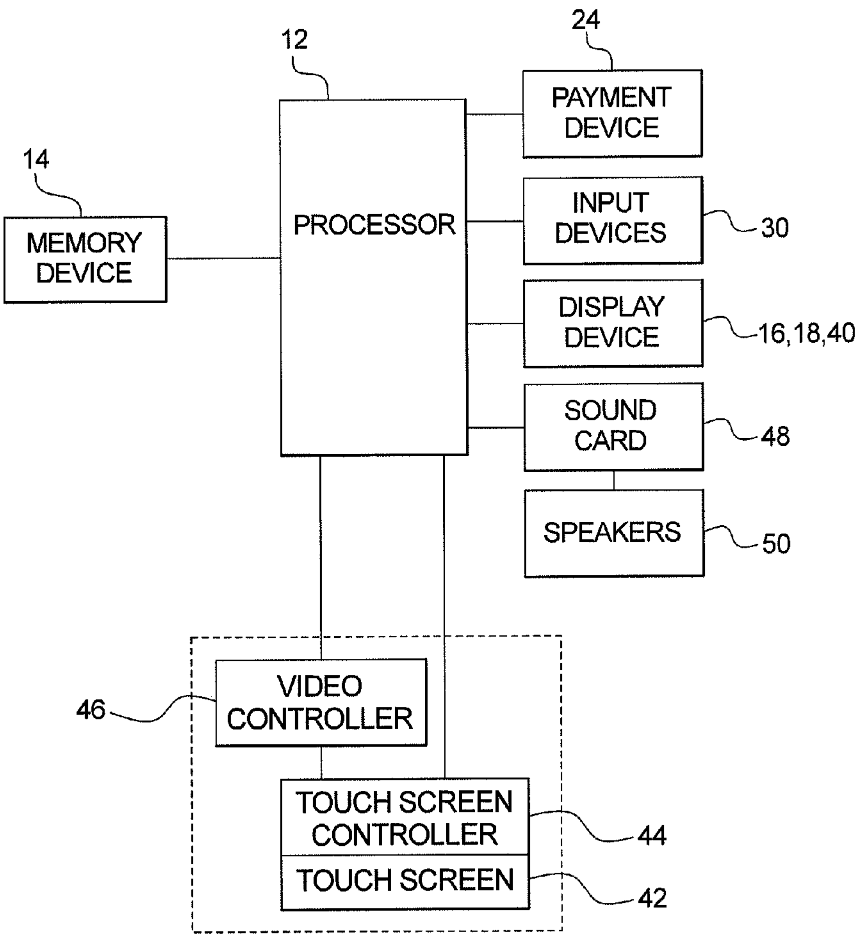
FIG. 2A is a schematic diagram of the electronic configuration of one embodiment of the gaming device of the present disclosure.

In one embodiment, as illustrated in FIG. 2A, the gaming device 10 preferably includes at least one processor 12, such as a microprocessor, a microcontroller-based platform, a suitable integrated circuit or one or more application-specific integrated circuits (ASIC's). The processor is in communication with or operable to access or to exchange signals with at least one data storage or memory device 14. In one embodiment, the processor and the memory device reside within the cabinet of the gaming device 10. The memory device stores program code and instructions, executable by the processor, to control the gaming device 10. The memory device also stores other data such as image data, event data, player input data, random or pseudo-random number generators, paytable data or information and applicable game rules that relate to the play of the gaming device 10. In one embodiment, the memory device includes random access memory (RAM), which can include non-volatile RAM (NVRAM), magnetic RAM (MRAM), ferroelectric RAM (FeRAM) and other forms as commonly understood in the gaming industry. In one embodiment, the memory device includes read only memory (ROM). In one embodiment, the memory device includes flash memory and/or EEPROM (electrically erasable programmable read only memory). Any other suitable magnetic, optical and/or semiconductor memory may operate in conjunction with the gaming device disclosed herein.

In one embodiment, part or all of the program code and/or operating data described above can be stored in a detachable or removable memory device, including, but not limited to, a suitable cartridge, disk, CD ROM, DVD or USB memory device. In other embodiments, part or all of the program code and/or operating data described above can be downloaded to the memory device through a suitable network.

In one embodiment, an operator or a player can use such a removable memory device in a desktop computer, a laptop personal computer, a personal digital assistant (PDA), portable computing device, or other computerized platform to implement the present disclosure. In one embodiment, the gaming device or gaming machine disclosed herein is operable over a wireless network, such as part of a wireless gaming system. In this embodiment, the gaming machine may be a hand held device, a mobile device or any other suitable wireless device that enables a player to play any suitable game at a variety of different locations. It should be appreciated that a gaming device or gaming machine as disclosed herein may be a device that has obtained approval from a regulatory gaming commission or a device that has not obtained approval from a regulatory gaming commission. It should be appreciated that the processor and memory device may be collectively referred to herein as a "computer" or "controller."

In one embodiment, as discussed in more detail below, the gaming device randomly generates awards and/or other game outcomes based on probability data. In one such embodiment, this random determination is provided through utilization of a random number generator (RNG), such as a true random number generator, a pseudo random number generator or other suitable randomization process. In one embodiment, each award or other game outcome is associated with a probability and the gaming device generates the award or other game outcome to be provided to the player based on the associated probabilities. In this embodiment, since the gaming device generates outcomes randomly or based upon one or more probability calculations, there is no certainty that the gaming device will ever provide the player with any specific award or other game outcome.

In another embodiment, as discussed in more detail below, the gaming device employs a predetermined or finite set or pool of awards or other game outcomes. In this embodiment, as each award or other game outcome is provided to the player, the gaming device flags or removes the provided award or other game outcome from the predetermined set or pool. Once flagged or removed from the set or pool, the specific provided award or other game outcome from that specific pool cannot be provided to the player again. This type of gaming device provides players with all of the available awards or other game outcomes over the course of the play cycle and guarantees the amount of actual wins and losses.

In another embodiment, as discussed below, upon a player initiating game play at the gaming device, the gaming device enrolls in a bingo game. In this embodiment, a bingo server calls the bingo balls that result in a specific bingo game outcome. The resultant game outcome is communicated to the individual gaming device to be provided to a player. In one embodiment, this bingo outcome is displayed to the player as a bingo game and/or in any form in accordance with the present disclosure.

In one embodiment, as illustrated in FIG. 2A, the gaming device includes one or more display devices controlled by the processor. The display devices are preferably connected to or mounted to the cabinet of the gaming device. The embodiment shown in FIG. 1A includes a central display device 16 which displays a primary game. This display device may also display any suitable secondary game associated with the primary game as well as information relating to the primary or secondary game. The alternative embodiment shown in FIG. 1B includes a central display device 16 and an upper display device 18. The upper display device may display the primary game, any suitable secondary game associated or not associated with the primary game and/or information relating to the primary or secondary game. These display devices may also serve as digital glass operable to advertise games or other aspects of the gaming establishment. As seen in FIGS. 1A and 1B, in one embodiment, the gaming device includes a credit display 20 which displays a player's current number of credits, cash, account balance or the equivalent. In one embodiment, the gaming device includes a bet display 22 which displays a player's amount wagered. In one embodiment, as described in more detail below, the gaming device includes a player tracking display 40 which displays information regarding a player's playing tracking status.

In another embodiment, at least one display device may be a mobile display device, such as a PDA or tablet PC, that enables play of at least a portion of the primary or secondary game at a location remote from the gaming device 10.

The display devices may include, without limitation, a monitor, a television display, a plasma display, a liquid crystal display (LCD) a display based on light emitting diodes (LED), a display based on a plurality of organic light-emitting diodes (OLEDs), a display based on polymer light-emitting diodes (PLEDs), a display based on a plurality of surface-conduction electron-emitters (SEDs), a display including a projected and/or reflected image or any other suitable electronic device or display mechanism. In one embodiment, as described in more detail below, the display device includes a touch-screen with an associated touch-screen controller. The display devices may be of any suitable size and configuration, such as a square, a rectangle or an elongated rectangle.

The display devices of the gaming device 10 are configured to display at least one and preferably a plurality of game or other suitable images, symbols and indicia such as any visual representation or exhibition of the movement of objects such as mechanical, virtual or video reels and wheels, dynamic lighting, video images, images of people, characters, places, things and faces of cards, and the like.

In one alternative embodiment, the symbols, images and indicia displayed on or of the display device may be in mechanical form. That is, the display device may include any electromechanical device, such as one or more mechanical objects, such as one or more rotatable wheels, reels or dice, configured to display at least one or a plurality of game or other suitable images, symbols or indicia.

As illustrated in FIG. 2A, in one embodiment, the gaming device 10 includes at least one payment acceptor 24 in communication with the processor. As seen in FIGS. 1A and 1B, the payment acceptor may include a coin slot 26 and a payment, note or bill acceptor 28, where the player inserts money, coins or tokens. The player can place coins in the coin slot or paper money, a ticket or voucher into the payment, note or bill acceptor. In other embodiments, devices such as readers or validators for credit cards, debit cards or credit slips may accept payment. In one embodiment, a player may insert an identification card into a card reader of the gaming device 10. In one embodiment, the identification card is a smart card having a programmed microchip or a magnetic strip coded with a player's identification, credit totals (or related data) and other relevant information. In another embodiment, a player may carry a portable device, such as a cell phone, a radio frequency identification tag or any other suitable wireless device, which communicates a player's identification, credit totals (or related data) and other relevant information to the gaming device 10. In one embodiment, money may be transferred to a gaming device 10 through electronic funds transfer. When a player funds the gaming device 10, the processor determines the amount of funds entered and displays the corresponding amount on the credit or other suitable display as described above.

As seen in FIGS. 1A, 1B and 2A, in one embodiment the gaming device 10 includes at least one and preferably a plurality of input devices 30 in communication with the processor. The input devices can include any suitable device which enables the player to produce an input signal which is received by the processor. In one embodiment, after appropriate funding of the gaming device 10, the input device is a game activation device, such as a pull arm 32 or a play button 34 which is used by the player to start any primary game or sequence of events in the gaming device 10. The play button can be any suitable play activator such as a bet one button, a max bet button or a repeat the bet button. In one embodiment, upon appropriate funding, the gaming device 10 begins the game play automatically. In another embodiment, upon the player engaging one of the play buttons, the gaming device 10 automatically activates game play.

In one embodiment, as shown in FIGS. 1A and 1B, one input device is a bet one button. The player places a bet by pushing the bet one button. The player can increase the bet by one credit each time the player pushes the bet one button. When the player pushes the bet one button, the number of credits shown in the credit display preferably decreases by one, and the number of credits shown in the bet display preferably increases by one. In another embodiment, one input device is a bet max button (not shown) which enables the player to bet the maximum wager permitted for a game of the gaming device 10.

In one embodiment, one input device is a cash out button 34. The player may push the cash out button and cash out to receive a cash payment or other suitable form of payment corresponding to the number of remaining credits. In one embodiment, when the player cashes out, a payment device, such as a ticket, payment or note generator 36 prints or otherwise generates a ticket or credit slip to provide to the player. The player receives the ticket or credit slip and may redeem the value associated with the ticket or credit slip via a cashier (or other suitable redemption system). In another embodiment, when the player cashes out, the player receives the coins or tokens in a coin payout tray. It should be appreciated that any suitable payout mechanisms, such as funding to the player's electronically recordable identification card may be implemented in accordance with the gaming device disclosed herein.

In one embodiment, as mentioned above and seen in FIG. 2A, one input device is a touch-screen 42 coupled with a touch-screen controller 44, or some other touch-sensitive display overlay to allow for player interaction with the images on the display. The touch-screen and the touch-screen controller are connected to a video controller 46. A player can make decisions and input signals into the gaming device 10 by touching the touch-screen at the appropriate places. One such input device is a conventional touch-screen button panel.

The gaming device 10 may further include a plurality of communication ports for enabling communication of the processor with external peripherals, such as external video sources, expansion buses, game or other displays, an SCSI port or a key pad.

In one embodiment, as seen in FIG. 2A, the gaming device 10 includes a sound generating device controlled by one or more sounds cards 48 which function in conjunction with the processor. In one embodiment, the sound generating device includes at least one and preferably a plurality of speakers 50 or other sound generating hardware and/or software for generating sounds, such as playing music for the primary and/or secondary game or for other modes of the gaming device 10, such as an attract mode. In one embodiment, the gaming device 10 provides dynamic sounds coupled with attractive multimedia images displayed on one or more of the display devices to provide an audio-visual representation or to otherwise display full-motion video with sound to attract players to the gaming device. During idle periods, the gaming device may display a sequence of audio and/or visual attraction messages to attract potential players to the gaming device. The videos may also be customized for or to provide any appropriate information.

In one embodiment, the gaming machine may include a sensor, such as a camera in communication with the processor (and possibly controlled by the processor) that is selectively positioned to acquire an image of a player actively using the gaming device and/or the surrounding area of the gaming device. In one embodiment, the camera may be configured to selectively acquire still or moving (e.g., video) images and may be configured to acquire the images in either an analog, digital or other suitable format. The display devices may be configured to display the image acquired by the camera as well as display the visible manifestation of the game in split screen or picture-in-picture fashion. For example, the camera may acquire an image of the player and the processor may incorporate that image into the primary and/or secondary game as a game image, symbol or indicia.

In one embodiment, in addition to winning credits or other awards in a base or primary game, the gaming device may also give players the opportunity to win credits in a bonus or secondary game or bonus or secondary round. The bonus or secondary game enables the player to obtain a prize or payout in addition to the prize or payout, if any, obtained from the base or primary game. In general, a bonus or secondary game produces a significantly higher level of player excitement than the base or primary game because it provides a greater expectation of winning than the base or primary game and is accompanied with more attractive or unusual features than the base or primary game. In one embodiment, the bonus or secondary game may be any type of suitable game, either similar to or completely different from the base or primary game.

In one embodiment, the triggering event or qualifying condition may be a selected outcome in the primary game or a particular arrangement of one or more indicia on a display device in the primary game. In other embodiments, the triggering event or qualifying condition may be by exceeding a certain amount of game play (such as number of games, number of credits, amount of time), or reaching a specified number of points earned during game play.

In another embodiment, the gaming device processor 12 or central server 56 randomly provides the player one or more plays of one or more secondary games. In one such embodiment, the gaming device does not provide any apparent reasons to the player for qualifying to play a secondary or bonus game. In this embodiment, qualifying for a bonus game is not triggered by an event in or based specifically on any of the plays of any primary game. That is, the gaming device may simply qualify a player to play a secondary game without any explanation or alternatively with simple explanations. In another embodiment, the gaming device (or central server) qualifies a player for a secondary game at least partially based on a game triggered or symbol triggered event, such as at least partially based on the play of a primary game.

In one embodiment, the gaming device includes a program which will automatically begin a bonus round after the player has achieved a triggering event or qualifying condition in the base or primary game. In another embodiment, after a player has qualified for a bonus game, the player may subsequently enhance his/her bonus game participation through continued play on the base or primary game. Thus, for each bonus qualifying event, such as a bonus symbol, that the player obtains, a given number of bonus game wagering points or credits may be accumulated in a "bonus meter" programmed to accrue the bonus wagering credits or entries toward eventual participation in a bonus game. The occurrence of multiple such bonus qualifying events in the primary game may result in an arithmetic or exponential increase in the number of bonus wagering credits awarded. In one embodiment, the player may redeem extra bonus wagering credits during the bonus game to extend play of the bonus game.

In one embodiment, no separate entry fee or buy in for a bonus game need be employed. That is, a player may not purchase an entry into a bonus game, rather they must win or earn entry through play of the primary game thus, encouraging play of the primary game. In another embodiment, qualification of the bonus or secondary game is accomplished through a simple "buy in" by the player, for example, if the player has been unsuccessful at qualifying through other specified activities. In another embodiment, the player must make a separate side-wager on the bonus game or wager a designated amount in the primary game to qualify for the secondary game. In this embodiment, the secondary game triggering event must occur and the side-wager (or designated primary game wager amount) must have been placed to trigger the secondary game.

Figure 2B:
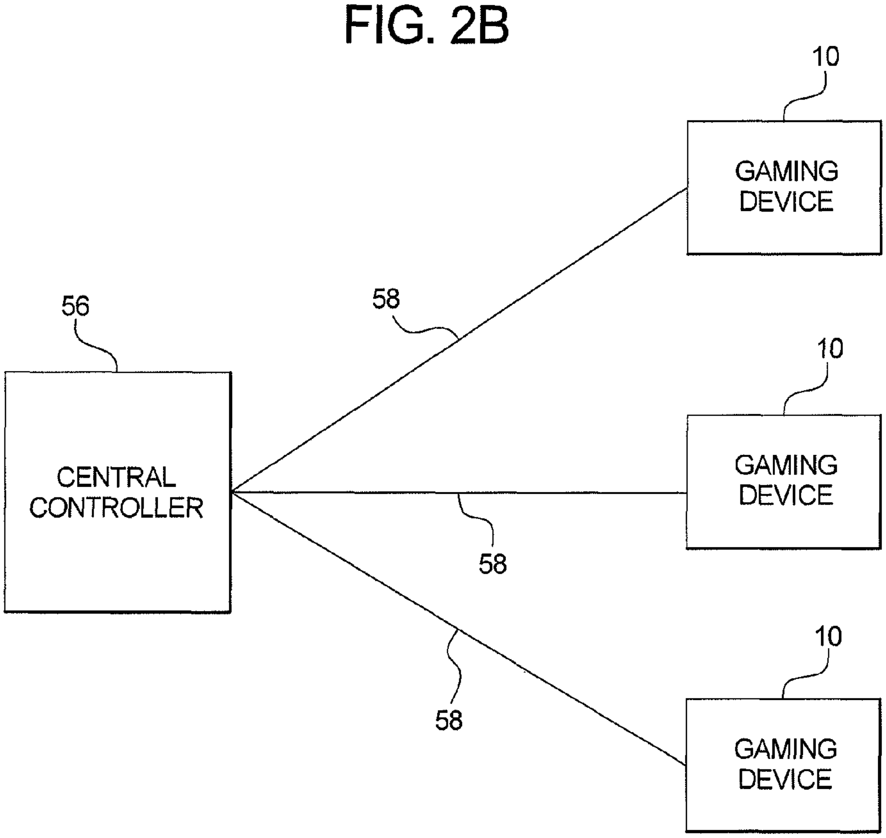

In one embodiment, as illustrated in FIG. 2B, one or more of the gaming devices 10 are in communication with each other and/or at least one central server, central controller or remote host 56 through a data network or remote communication link 58. In this embodiment, the central server, central controller or remote host is any suitable server or computing device which includes at least one processor and at least one memory or storage device. In different such embodiments, the central server is a progressive controller or a processor of one of the gaming devices in the gaming system. In these embodiments, the processor of each gaming device is designed to transmit and receive events, messages, commands or any other suitable data or signal between the individual gaming device and the central server. The gaming device processor is operable to execute such communicated events, messages or commands in conjunction with the operation of the gaming device. Moreover, the processor of the central server is designed to transmit and receive events, messages, commands or any other suitable data or signal between the central server and each of the individual gaming devices. The central server processor is operable to execute such communicated events, messages or commands in conjunction with the operation of the central server. It should be appreciated that one, more or each of the functions of the central controller as disclosed herein may be performed by one or more gaming device processors. It should be further appreciated that one, more or each of the functions of one or more gaming device processors as disclosed herein may be performed by the central controller.

In one embodiment, the game outcome provided to the player is determined by a central server or controller and provided to the player at the gaming device. In this embodiment, each of a plurality of such gaming devices are in communication with the central server or controller. Upon a player initiating game play at one of the gaming devices, the initiated gaming device communicates a game outcome request to the central server or controller.

In one embodiment, the central server or controller receives the game outcome request and randomly generates a game outcome for the primary game based on probability data. In another embodiment, the central server or controller randomly generates a game outcome for the secondary game based on probability data. In another embodiment, the central server or controller randomly generates a game outcome for both the primary game and the secondary game based on probability data. In this embodiment, the central server or controller is capable of storing and utilizing program code or other data similar to the processor and memory device of the gaming device.

In an alternative embodiment, the central server or controller maintains one or more predetermined pools or sets of predetermined game outcomes. In this embodiment, the central server or controller receives the game outcome request and independently selects a predetermined game outcome from a set or pool of game outcomes. The central server or controller flags or marks the selected game outcome as used. Once a game outcome is flagged as used, it is prevented from further selection from the set or pool and cannot be selected by the central controller or server upon another wager. The provided game outcome can include a primary game outcome, a secondary game outcome, primary and secondary game outcomes, or a series of game outcomes such as free games.

The central server or controller communicates the generated or selected game outcome to the initiated gaming device. The gaming device receives the generated or selected game outcome and provides the game outcome to the player. In an alternative embodiment, how the generated or selected game outcome is to be presented or displayed to the player, such as a reel symbol combination of a slot machine or a hand of cards dealt in a card game, is also determined by the central server or controller and communicated to the initiated gaming device to be presented or displayed to the player. Central production or control can assist a gaming establishment or other entity in maintaining appropriate records, controlling gaming, reducing and preventing cheating or electronic or other errors, reducing or eliminating win-loss volatility and the like.

In another embodiment, a predetermined game outcome value is determined for each of a plurality of linked or networked gaming devices based on the results of a bingo, keno or lottery game. In this embodiment, each individual gaming device utilizes one or more bingo, keno or lottery games to determine the predetermined game outcome value provided to the player for the interactive game played at that gaming device. In one embodiment, the bingo, keno or lottery game is displayed to the player. In another embodiment, the bingo, keno or lottery game is not displayed to the player, but the results of the bingo, keno or lottery game determine the predetermined game outcome value for the primary or secondary game.

In the various bingo embodiments, as each gaming device is enrolled in the bingo game, such as upon an appropriate wager or engaging an input device, the enrolled gaming device is provided or associated with a different bingo card. Each bingo card consists of a matrix or array of elements, wherein each element is designated with a separate indicia, such as a number. It should be appreciated that each different bingo card includes a different combination of elements. For example, if four bingo cards are provided to four enrolled gaming devices, the same element may be present on all four of the bingo cards while another element may solely be present on one of the bingo cards.

In operation of these embodiments, upon providing or associating a different bingo card to each of a plurality of enrolled gaming devices, the central controller randomly selects or draws, one at a time, a plurality of the elements. As each element is selected, a determination is made for each gaming device as to whether the selected element is present on the bingo card provided to that enrolled gaming device. This determination can be made by the central controller, the gaming device, a combination of the two, or in any other suitable manner. If the selected element is present on the bingo card provided to that enrolled gaming device, that selected element on the provided bingo card is marked or flagged. This process of selecting elements and marking any selected elements on the provided bingo cards continues until one or more predetermined patterns are marked on one or more of the provided bingo cards. It should be appreciated that in one embodiment, the gaming device requires the player to engage a daub button (not shown) to initiate the process of the gaming device marking or flagging any selected elements.

After one or more predetermined patterns are marked on one or more of the provided bingo cards, a game outcome is determined for each of the enrolled gaming devices based, at least in part, on the selected elements on the provided bingo cards. As described above, the game outcome determined for each gaming device enrolled in the bingo game is utilized by that gaming device to determine the predetermined game outcome provided to the player. For example, a first gaming device to have selected elements marked in a predetermined pattern is provided a first outcome of win $10 which will be provided to a first player regardless of how the first player plays in a first game and a second gaming device to have selected elements marked in a different predetermined pattern is provided a second outcome of win $2 which will be provided to a second player regardless of how the second player plays a second game. It should be appreciated that as the process of marking selected elements continues until one or more predetermined patterns are marked, this embodiment ensures that at least one bingo card will win the bingo game and thus at least one enrolled gaming device will provide a predetermined winning game outcome to a player. It should be appreciated that other suitable methods for selecting or determining one or more predetermined game outcomes may be employed.

In one example of the above-described embodiment, the predetermined game outcome may be based on a supplemental award in addition to any award provided for winning the bingo game as described above. In this embodiment, if one or more elements are marked in supplemental patterns within a designated number of drawn elements, a supplemental or intermittent award or value associated with the marked supplemental pattern is provided to the player as part of the predetermined game outcome. For example, if the four corners of a bingo card are marked within the first twenty selected elements, a supplemental award of $10 is provided to the player as part of the predetermined game outcome. It should be appreciated that in this embodiment, the player of a gaming device may be provided a supplemental or intermittent award regardless of if the enrolled gaming device's provided bingo card wins or does not win the bingo game as described above.

In another embodiment, one or more of the gaming devices are in communication with a central server or controller for monitoring purposes only. That is, each individual gaming device randomly generates the game outcomes to be provided to the player and the central server or controller monitors the activities and events occurring on the plurality of gaming devices. In one embodiment, the gaming network includes a real-time or on-line accounting and gaming information system operably coupled to the central server or controller. The accounting and gaming information system of this embodiment includes a player database for storing player profiles, a player tracking module for tracking players and a credit system for providing automated casino transactions.

In one embodiment, the gaming device disclosed herein is associated with or otherwise integrated with one or more player tracking systems. Player tracking systems enable gaming establishments to recognize the value of customer loyalty through identifying frequent customers and rewarding them for their patronage. In one embodiment, the gaming device and/or player tracking system tracks any players gaming activity at the gaming device. In one such embodiment, the gaming device includes at least one card reader 38 in communication with the processor. In this embodiment, a player is issued a player identification card which has an encoded player identification number that uniquely identifies the player. When a player inserts their playing tracking card into the card reader to begin a gaming session, the card reader reads the player identification number off the player tracking card to identify the player. The gaming device and/or associated player tracking system timely tracks any suitable information or data relating to the identified player's gaming session. Directly or via the central controller, the gaming device processor communicates such information to the player tracking system. The gaming device and/or associated player tracking system also timely tracks when a player removes their player tracking card when concluding play for that gaming session. In another embodiment, rather than requiring a player to insert a player tracking card, the gaming device utilizes one or more portable devices carried by a player, such as a cell phone, a radio frequency identification tag or any other suitable wireless device to track when a player begins and ends a gaming session. In another embodiment, the gaming device utilizes any suitable biometric technology or ticket technology to track when a player begins and ends a gaming session.

During one or more gaming sessions, the gaming device and/or player tracking system tracks any suitable information or data, such as any amounts wagered, average wager amounts and/or the time these wagers are placed. In different embodiments, for one or more players, the player tracking system includes the player's account number, the player's card number, the player's first name, the player's surname, the player's preferred name, the player's player tracking ranking, any promotion status associated with the player's player tracking card, the player's address, the player's birthday, the player's anniversary, the player's recent gaming sessions, or any other suitable data. In one embodiment, such tracked information and/or any suitable feature associated with the player tracking system is displayed on a player tracking display 40. In another embodiment, such tracked information and/or any suitable feature associated with the player tracking system is displayed via one or more service windows (not shown) which are displayed on the central display device and/or the upper display device.

In one embodiment, a plurality of the gaming devices are capable of being connected together through a data network. In one embodiment, the data network is a local area network (LAN), in which one or more of the gaming devices are substantially proximate to each other and an on-site central server or controller as in, for example, a gaming establishment or a portion of a gaming establishment. In another embodiment, the data network is a wide area network (WAN) in which one or more of the gaming devices are in communication with at least one off-site central server or controller. In this embodiment, the plurality of gaming devices may be located in a different part of the gaming establishment or within a different gaming establishment than the off-site central server or controller. Thus, the WAN may include an off-site central server or controller and an off-site gaming device located within gaming establishments in the same geographic area, such as a city or state. The WAN gaming system may be substantially identical to the LAN gaming system described above, although the number of gaming devices in each system may vary relative to each other.

In another embodiment, the data network is an internet or intranet. In this embodiment, the operation of the gaming device can be viewed at the gaming device with at least one internet browser. In this embodiment, operation of the gaming device and accumulation of credits may be accomplished with only a connection to the central server or controller (the internet/intranet server) through a conventional phone or other data transmission line, digital subscriber line (DSL), T-1 line, coaxial cable, fiber optic cable, or other suitable connection. In this embodiment, players may access an internet game page from any location where an internet connection and computer, or other internet facilitator is available. The expansion in the number of computers and number and speed of internet connections in recent years increases opportunities for players to play from an ever-increasing number of remote sites. It should be appreciated that enhanced bandwidth of digital wireless communications may render such technology suitable for some or all communications, particularly if such communications are encrypted. Higher data transmission speeds may be useful for enhancing the sophistication and response of the display and interaction with the player.

As mentioned above, in one embodiment, the present disclosure may be employed in a server based gaming system. In one such embodiment, as described above, one or more gaming devices are in communication with a central server or controller. The central server or controller may be any suitable server or computing device which includes at least one processor and a memory or storage device. In alternative embodiments, the central server is a progressive controller or another gaming machine in the gaming system. In one embodiment, the memory device of the central server stores different game programs and instructions, executable by a gaming device processor, to control the gaming device. Each executable game program represents a different game or type of game which may be played on one or more of the gaming devices in the gaming system. Such different games may include the same or substantially the same game play with different pay tables. In different embodiments, the executable game program is for a primary game, a secondary game or both. In another embodiment, the game program may be executable as a secondary game to be played simultaneous with the play of a primary game (which may be downloaded to or fixed on the gaming device) or vice versa.

In this embodiment, each gaming device at least includes one or more display devices and/or one or more input devices for interaction with a player. A local processor, such as the above-described gaming device processor or a processor of a local server, is operable with the display device(s) and/or the input device(s) of one or more of the gaming devices.

In operation, the central controller is operable to communicate one or more of the stored game programs to at least one local processor. In different embodiments, the stored game programs are communicated or delivered by embedding the communicated game program in a device or a component (e.g., a microchip to be inserted in a gaming device), writing the game program on a disc or other media, downloading or streaming the game program over a dedicated data network, internet or a telephone line. After the stored game programs are communicated from the central server, the local processor executes the communicated program to facilitate play of the communicated program by a player through the display device(s) and/or input device(s) of the gaming device. That is, when a game program is communicated to a local processor, the local processor changes the game or type of game played at the gaming device.

In another embodiment, a plurality of gaming devices at one or more gaming sites may be networked to the central server in a progressive configuration, as known in the art, wherein a portion of each wager to initiate a base or primary game may be allocated to one or more progressive awards. In one embodiment, a progressive gaming system host site computer is coupled to a plurality of the central servers at a variety of mutually remote gaming sites for providing a multi-site linked progressive automated gaming system. In one embodiment, a progressive gaming system host site computer may serve gaming devices distributed throughout a number of properties at different geographical locations including, for example, different locations within a city or different cities within a state.

In one embodiment, the progressive gaming system host site computer is maintained for the overall operation and control of the progressive gaming system. In this embodiment, a progressive gaming system host site computer oversees the entire progressive gaming system and is the master for computing all progressive jackpots. All participating gaming sites report to, and receive information from, the progressive gaming system host site computer. Each central server computer is responsible for all data communication between the gaming device hardware and software and the progressive gaming system host site computer. In one embodiment, an individual gaming machine may trigger a progressive award win. In another embodiment, a central server (or the progressive gaming system host site computer) determines when a progressive award win is triggered. In another embodiment, an individual gaming machine and a central controller (or progressive gaming system host site computer) work in conjunction with each other to determine when a progressive win is triggered, for example through an individual gaming machine meeting a predetermined requirement established by the central controller.

In one embodiment, a progressive award win is triggered based on one or more game play events, such as a symbol-driven trigger. In other embodiments, the progressive award triggering event or qualifying condition may be by exceeding a certain amount of game play (such as number of games, number of credits, or amount of time), or reaching a specified number of points earned during game play. In another embodiment, a gaming device is randomly or apparently randomly selected to provide a player of that gaming device one or more progressive awards. In one such embodiment, the gaming device does not provide any apparent reasons to the player for winning a progressive award, wherein winning the progressive award is not triggered by an event in or based specifically on any of the plays of any primary game. That is, a player is provided a progressive award without any explanation or alternatively with simple explanations. In another embodiment, a player is provided a progressive award at least partially based on a game triggered or symbol triggered event, such as at least partially based on the play of a primary game.

In one embodiment, one or more of the progressive awards are each funded via a side bet or side wager. In this embodiment, a player must place or wager a side bet to be eligible to win the progressive award associated with the side bet. In one embodiment, the player must place the maximum bet and the side bet to be eligible to win one of the progressive awards. In another embodiment, if the player places or wagers the required side bet, the player may wager at any credit amount during the primary game (i.e., the player need not place the maximum bet and the side bet to be eligible to win one of the progressive awards). In one such embodiment, the greater the player's wager (in addition to the placed side bet), the greater the odds or probability that the player will win one of the progressive awards. It should be appreciated that one or more of the progressive awards may each be funded, at least in part, based on the wagers placed on the primary games of the gaming machines in the gaming system, via a gaming establishment or via any suitable manner.

In another embodiment, one or more of the progressive awards are partially funded via a side-bet or side-wager which the player may make (and which may be tracked via a side-bet meter). In one embodiment, one or more of the progressive awards are funded with only side-bets or side-wagers placed. In another embodiment, one or more of the progressive awards are funded based on player's wagers as described above as well as any side-bets or side-wagers placed.

In one alternative embodiment, a minimum wager level is required for a gaming device to qualify to be selected to obtain one of the progressive awards. In one embodiment, this minimum wager level is the maximum wager level for the primary game in the gaming machine. In another embodiment, no minimum wager level is required for a gaming machine to qualify to be selected to obtain one of the progressive awards.

In another embodiment, a plurality of players at a plurality of linked gaming devices in a gaming system participate in a group gaming environment. In one embodiment, a plurality of players at a plurality of linked gaming devices work in conjunction with one another, such as playing together as a team or group, to win one or more awards. In one such embodiment, any award won by the group is shared, either equally or based on any suitable criteria, amongst the different players of the group. In another embodiment, a plurality of players at a plurality of linked gaming devices compete against one another for one or more awards. In one such embodiment, a plurality of players at a plurality of linked gaming devices participate in a gaming tournament for one or more awards. In another embodiment, a plurality of players at a plurality of linked gaming devices play for one or more awards wherein an outcome generated by one gaming device affects the outcomes generated by one or more linked gaming devices.

One or more embodiments of the present disclosure comprise a gaming system including a live table game and an activity tracking and reward system. The tracking system is configured to collect and store raw data relating to the wagering activities of players at a gaming table. The present disclosure also includes methods of utilizing the obtained data. For example, the data may be used to calculate the house rake, where the house rake may be based on the size of the pot at the end of a hand. In one embodiment, certain criteria are applied to the obtained data to determine if a player qualifies to receive a progressive jackpot award. In another embodiment, the collected data is analyzed to determine a player's wagering history to determine whether or not the player is entitled to certain complimentary items. In another embodiment, the gaming system notifies a player that a seat is vacant at a poker table, where the player is located at a remote gaming device or gaming table.

Primary Embodiment of Multi-Hand Poker Game

Figure 3:
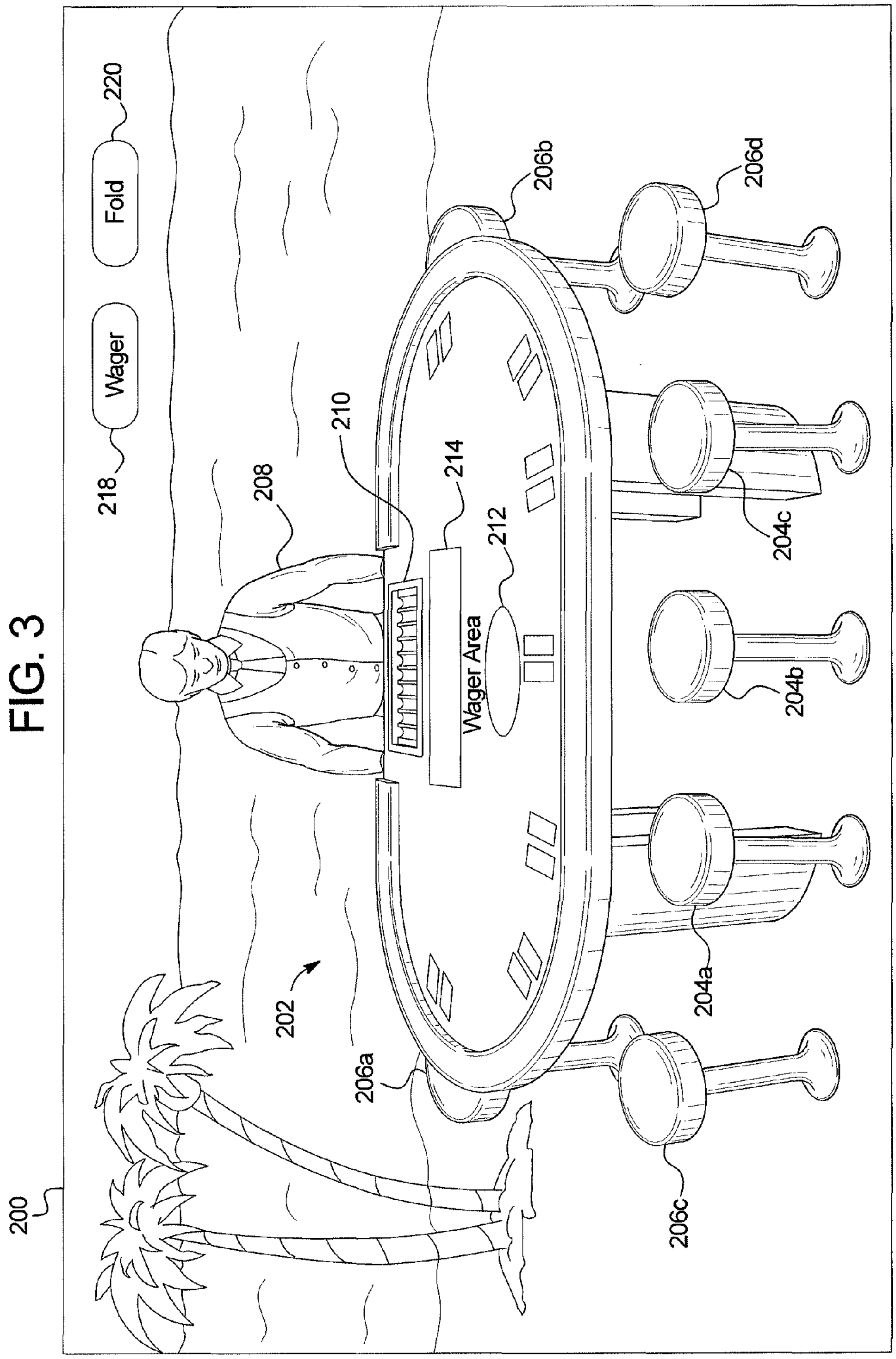
FIG. 3 is an illustration of a screen display showing a three-dimensional gaming table with a virtual dealer.

As shown in FIG. 3, in an embodiment, the gaming device 10 incorporates a Texas Hold'em style poker game where the gaming device 10 initially deals the player six cards face-down to form three two-card player hands 204*a*, 204*b*, and 204*c*. The gaming device 10 also deals eight cards to form four two-card house hands 206*a*, 206*b*, 206*c*, and 206*d*. Accordingly, in this embodiment the player has one less hand than the house. The cards are dealt from a single virtual conventional deck of fifty-two cards. In other embodiments, two or more decks of cards may be used. Cards may be dealt as in a traditional game of cards or in the case of the gaming device 10, may also include that the cards are randomly selected from a predetermined number of cards.

In this embodiment, the gaming device 10 requires the player to establish a designated wager amount. This designated wager amount is wagered for any hands the player chooses to keep (i.e., to not fold). However, it should be appreciated that in other embodiments there are no or different wagering restrictions on subsequent player hands. In an embodiment, the player must place at least one wager on one of the hands. Accordingly, if the player folds the first player hand 204*a* and the second player hand 204*b*, then the player automatically plays the third player hand 204*c*.

In a round of play of the game, the gaming device 10 reveals the first player hand 204*a* to the player and enables the player to wager on or fold the first player hand 204*a*. If the player chooses to fold the first player hand 204*a*, then the gaming device 10 discards or makes inactive the cards in the first player hand 204*a*. Then, the gaming device 10 reveals the second player hand 204*b* to the player and the player must choose whether to wager on or fold the second player hand 204*b*. This process continues for all of the player hands. It should be appreciated that in other embodiments, all of the player's hands are initially revealed to the player prior to the player selecting whether or not to fold a particular hand. If the player chooses to wager on a hand, the player wagers the designated wager amount and this amount is added to the pot. Likewise, when the player wagers on a particular hand, the gaming device makes active one of the house hands and contributes an amount equal to the designated wager amount to the pot. As mentioned above, the player is required to wager on at least one of the player hands. Therefore, if the player folds the first two hands, the third hand is played by default. In another embodiment, the player is required to place an initial ante or initial in addition to placing a wager on at least one of the hands. In another embodiment, the player is required to place an initial ante or initial wager but is not required to wager on any of the player hands. In this embodiment, if the player does not place a wager on any of the player hand, the player simply forfeits the ante.

Referring to FIGS. 4A to 4E, an example round of play of the game is shown where the player wins the round by having the highest ranking poker hand. The gaming device 10 utilizes conventional poker hand rankings to determine which of the wagered on player and house hands is the highest ranking hand. As mentioned above, the ranking of hands in Texas Hold'em is determined by selecting a five card combination of the player's two hole cards and the five community cards (i.e., seven total cards) that result in the highest ranking hand. The gaming device 10 provides the player with an award based on a winning hand and the credits the player wagered.

Figure 4A:
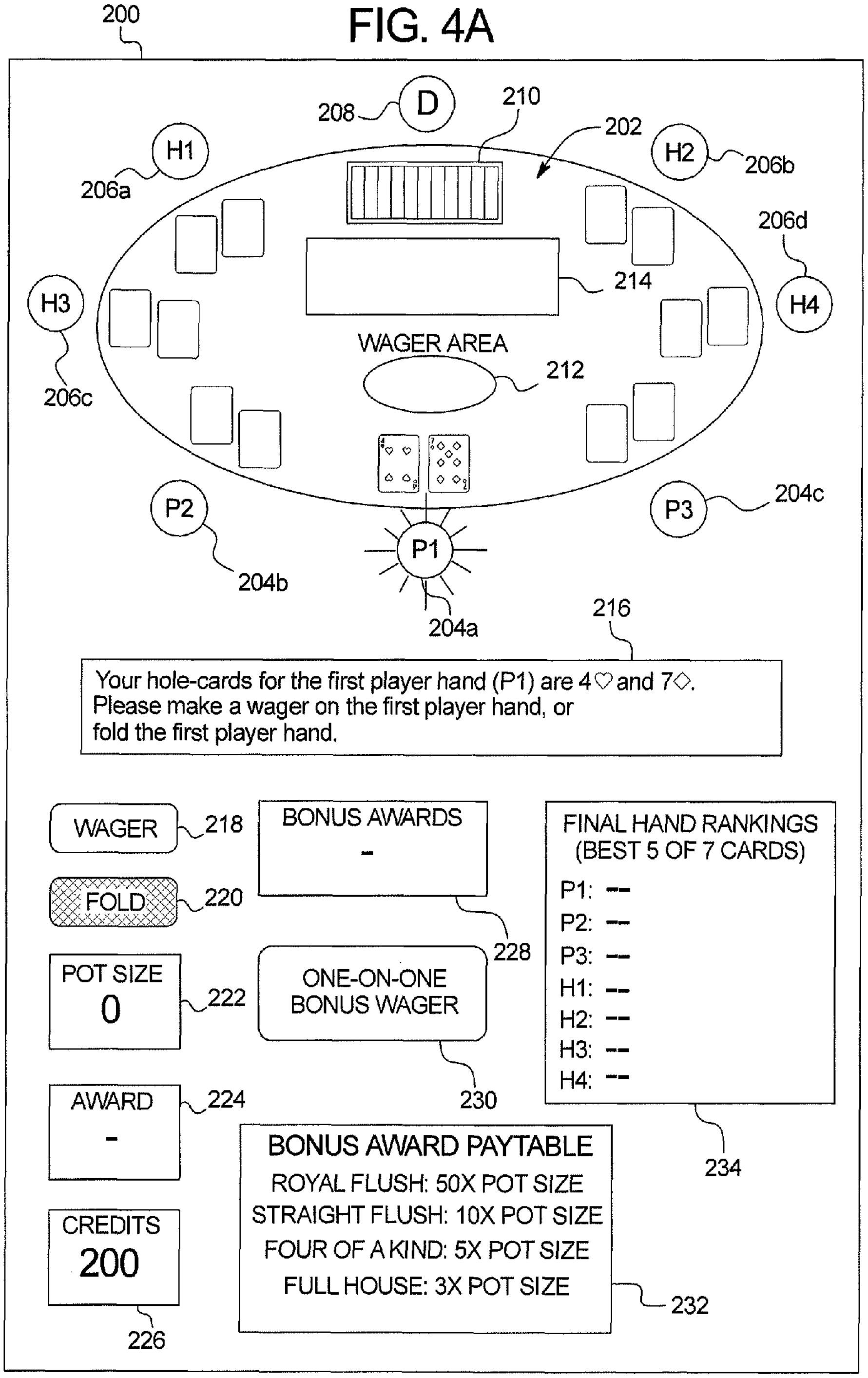
FIGS. 4A, 4B, 4C, 4D and 4E are illustrations of screen displays for a round of the game, where the player wins the primary wager.

As shown in FIG. 4A, the gaming device 10 includes a display 200 for displaying a play area 202. In the illustrated example, the play area 202 is a virtual visual representation of a multiplayer poker table. In this embodiment, the game is played by a single player against a single opponent, where the opponent is a virtual player that represents the house or casino or gaming establishment. The virtual play area 202 includes sufficient space to accommodate a plurality of player hands 204*a*, 204*b* and 204*c*, and a plurality of house hands 206*a*, 206*b*, 206*c* and 206*d*. The play area 202 can also include other graphical elements such as a dealer 208, a wager or wagering area 212 and a community card area 214.

In one embodiment, the gaming device 10 offers the player a choice of a plurality of customizable graphical elements or animated graphical elements such as a background scene, and dealer, house and player icons (e.g., the seaside graphical display of FIG. 3). It should also be appreciated that the multiple player hands 204*a*, 204*b* and 204*c* may be associated with a single displayed player icon or multiple player icons (i.e., a different player icon for each player hand). Similarly, the multiple house hands 206*a*, 206*b*, 206*c* and 206*d* may be associated with a single displayed house icon or a multiple house icons.

The display 200 also includes a message display area 216, a wager input 218, a fold input 220, a pot size display 222, an award display 224, a credits display 226, a bonus award display 228, a bonus wager input 230, a bonus award paytable display 232, and a hand rank display 234. It should be appreciated that in other embodiments, certain of the above listed input devices or displays may be omitted and other displays and inputs may be included, as shown in FIGS. 1A and 1B and as described above.

In this example, the bonus award paytable display 232 lists bonus awards that are associated with a player's final hand. That is, if the player's winning hand has a rank of Full House or better, the gaming device 10 awards the player a multiple of the size of the pot. In particular, in this example: (a) if the player achieves a winning hand that is a Full House, the gaming device 10 awards the player a bonus award that is three times the size of the pot; (b) if the player achieves a winning hand that is a Four-Of-A-Kind, the bonus award is five times the size of the pot; (c) if the player achieves a winning hand that is a Straight Flush, the bonus award is ten times the size of the pot; and (d) if the player achieves a winning hand that is a Royal Flush, the award is fifty times the size of pot. Therefore, if the player makes a larger initial wager and plays multiple hands, the pot becomes larger such that the player can win a potentially larger bonus award. It should be appreciated that the bonus awards may be different multiples of the pot size than is indicated in the bonus award paytable 232. Moreover, it should be appreciated that the bonus awards may be based only on the size of the initial wager and not on the size of the final pot. Similarly, the bonus awards may be based on the wagers made only by the player and not on the total pot size (i.e., where the total pot size includes the player's wagers and the amounts contributed by the house). In another embodiment, the player does not need to win the round of play of the game in order to be eligible for the bonus award. That is, if the player achieves a hand of Four-Of-A-Kind and the house achieves a Royal Flush, the gaming device 10 would still provide the player with a bonus award of five times the pot even though the player did not win the primary game.

Referring again to FIG. 4A, in this embodiment, a round of play of the game begins with the gaming device 10 dealing a plurality of cards face-down to form the three player hands 204*a*, 20*b* and 204*c* and the four house hands 206*a*, 206*b*, 206*c* and 206*d*. In this round of play, the player begins with two hundred credits, as indicated by the credits display 226. The gaming device 10 prompts the player to enter a designated wager amount. The gaming device 10 then reveals the first player hand 204a to the player (i.e., the identity of the cards in the first player hand 204a are not known to the virtual opponent or house). In this example, the cards in the first player hand 204a are the 4♥ and the 7♦, as indicated in the message display 216. As also indicated in the message display 216, the gaming device 10 prompts the player to place a wager on the first player hand 204a or to fold the hand. In this example, the player chooses to fold the first player hand 204a by activating the fold input 220. In this embodiment, the player is required to place at least one wager on one of the player hands, where the wager is equal to the designated wager amount. By default, if the player folds the first two player hands 204a and 204b, the player must wager on the third player hand 204c. However, in an alternate embodiment, the gaming device requires the player to place an initial ante but does not require the player to wager on any of the hands. Therefore, in this embodiment, if the player does not wager on any of the hands, the player simply forfeits the ante.

Figure 4B:
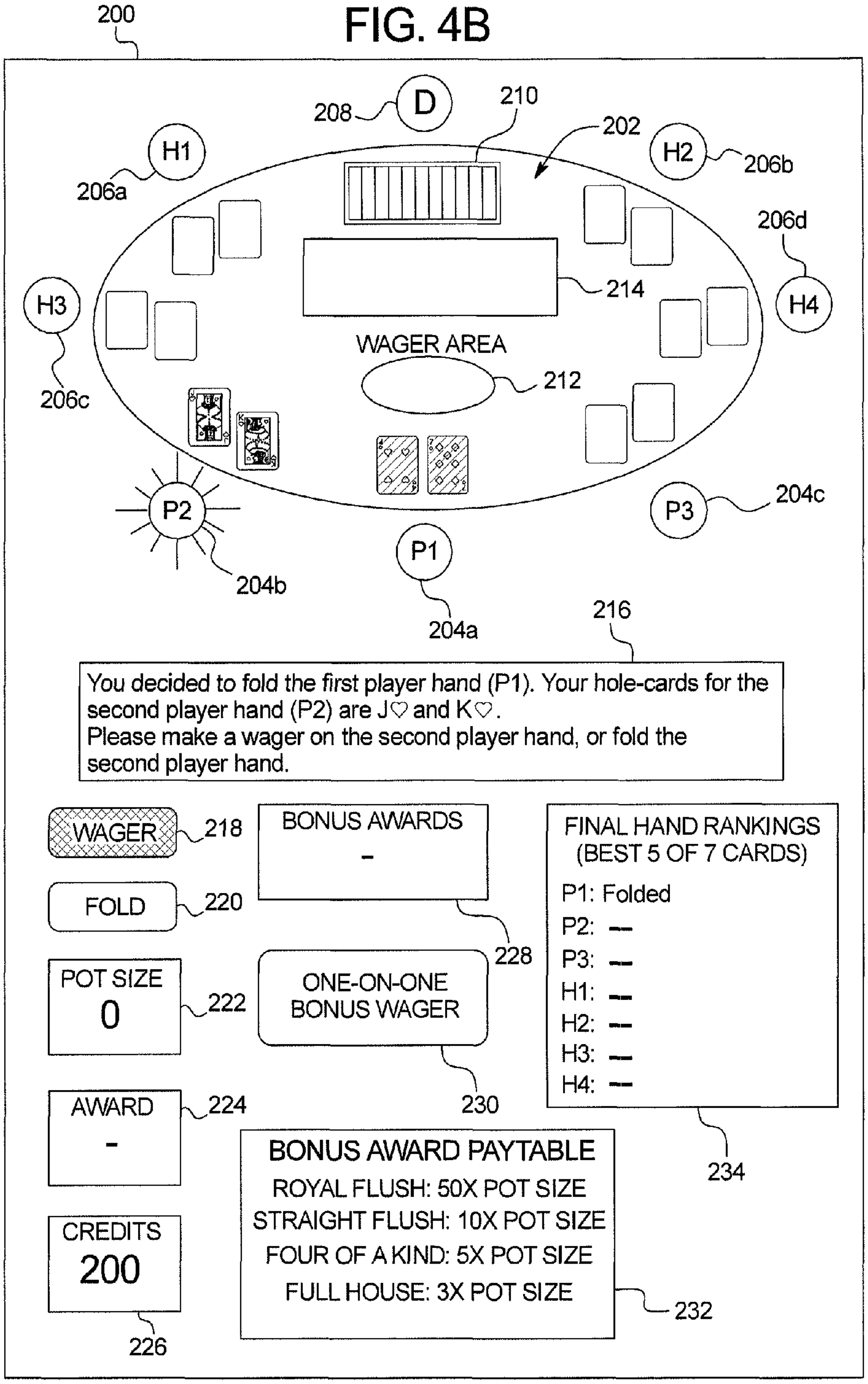

As shown in FIG. 4B, the hand rank display 234 indicates that the player has chosen to fold the first player hand 204a. In general, the hand rank display 234 shows the rankings of all player hands and house hands, and whether one or more of these hands have been folded. Also, in this embodiment, the cards in the first player hand 204a are deactivated on the display 200. It should be appreciated that the display 200 of the gaming device 10 may indicate that the player hands are folded in any suitable fashion such as dimming the display down, graphically moving the card to a discard pile, or otherwise visually or audibly indicated same to the player. The gaming device 10 reveals the cards in the second player hand 204b. The cards in the second player hand 204b are the J♥ and the K♥, as indicated in the message display 216. The gaming device 10 prompts the player to either place a wager on the second player hand 204b or fold the hand, as also indicated in the message display 216. In this example, because the second player hand 204b of J♥K♥ is a relatively high ranking hand, the player chooses to place a wager, as indicated by the wager input 218.

Figure 4C:
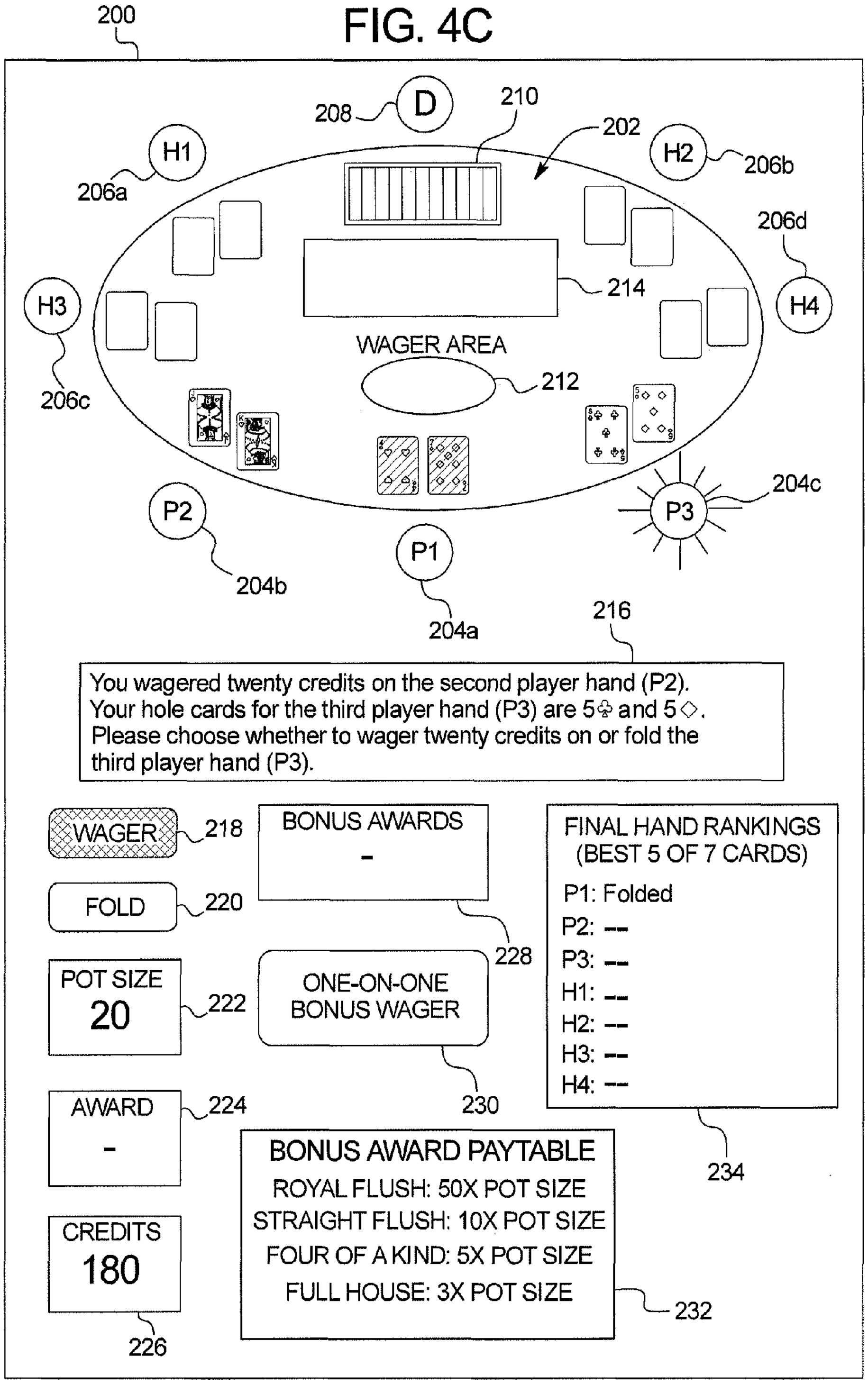

As shown in FIG. 4C, the player has made a primary wager of twenty credits on the second player hand 204b, as indicated by the message display 216. Accordingly, the pot size is twenty as indicated by the pot size display 222 and the player's total credits have been reduced to one-hundred eighty as indicated by the credits display 226. The gaming device 10 reveals the identity of the cards in the third player hand 204c to be the 5♣ and the 5♦, and indicates these identities to the player on the message display 216. The gaming device 10 prompts the player to either place a wager on the third player hand 204c or the fold the third player hand 204c, as indicated by the message display 216. In this embodiment, once the player has made an initial wager, any wagers on the remaining hands must be in the same amount. Therefore, because the player wagered twenty credits on the second player hand 204b, any wager on the third player hand 204c must be for twenty credits as well. However, it should be appreciated that in other embodiments the player's wagers on subsequent hands are not limited by the wager amount of a previous hand. In this example, because the third player hand 204c is a relatively high ranking hand of 5♣5♦, the player opts to place a wager on this hand as well, as indicated by the activated wager input 218.

Figure 4D:
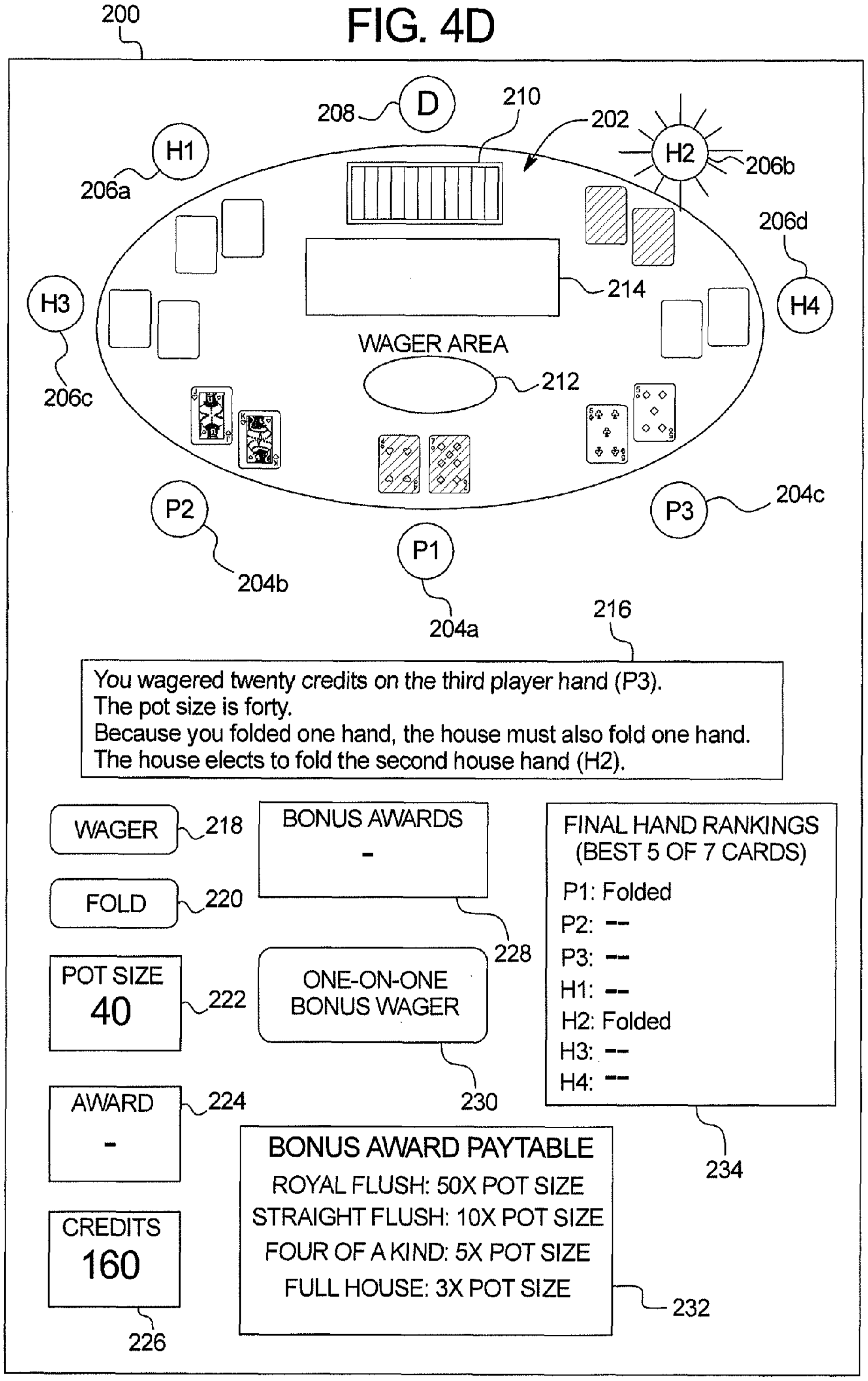

As shown in FIG. 4D, the player has made a primary wager of twenty credits on the third player hand 204c, as indicated by the message display 216. Accordingly, the pot size is increased to forty credits as indicated by the pot size display 222. Also, the player's total credits have been reduced to one-hundred sixty, as indicated by the credits display 226.

Of the three player hands 204a, 204b and 204c, the player folded a total of one hand (i.e., the first player hand 204a). In this embodiment, the gaming device 10 must fold the same number of house hands that the player has folded. Therefore, in this example play of the game, the gaming device 10 must fold one of the house hands. As indicated by the message display 216, the gaming device 10 causes the second house hand 206b to be folded. The selection of the one or more house hands to be folded may be a random selection, a predetermined selection, or based on which hands the player has folded. In one embodiment, if a dealer hand is to be folded in response to the folding of a player hand, a dealer hand is selected that is closest in rank to the rank of the player's hand that was folded. Therefore, if the player folded a relatively high ranking hand such as a pair of Jacks, then a dealer may also be forced into folding a relatively high ranking such as a pair of Queens. In another embodiment, the player can choose which of the dealer hands to fold prior to the player seeing the dealer's cards.

In one embodiment, the cards in the house hands 206a, 206b, 206c and 206d are revealed prior to making the selection of which hands to fold. Therefore, in this embodiment, the gaming device 10 causes the lowest ranking house hands to be folded. For example, if the house hands include A♥A♠ K♦K♣, Q♥Q♦, and 2♥7♣, the lowest ranking hand 2♥7♣ is folded. In one embodiment where the lowest house hand is folded, where the modified Texas Hold'em game is played at a live gaming table, the table employs one or more suitable card tracking technologies to allow the live dealer to receive indications or prompts from the gaming system as to which hand the dealer should fold. These embodiments allow the gaming establishment an advantage over the player because the player must make decisions to fold or wager earlier hands without knowledge of the identity of cards in later hands. In another embodiment, the gaming device randomly determines which of the house hands to fold. In another embodiment, the gaming device folds a hand corresponding to the hand folded by the player (e.g., if the player folds the first player hand 204a, the gaming device causes the first house hand 206a to be folded).

In one embodiment, where the gaming device 10 causes the lowest ranking house hands to be folded, the identity of the cards in the player hands 204a, 204b and 204c is not taken into account. In another embodiment, the identities of the cards in the player hands 204a, 204b and 204c is taken into account. In this embodiment, the gaming device 10 may determine not to fold the lowest ranking hands depending on the values of the cards in the players hand and the house hands.

Figure 4E:
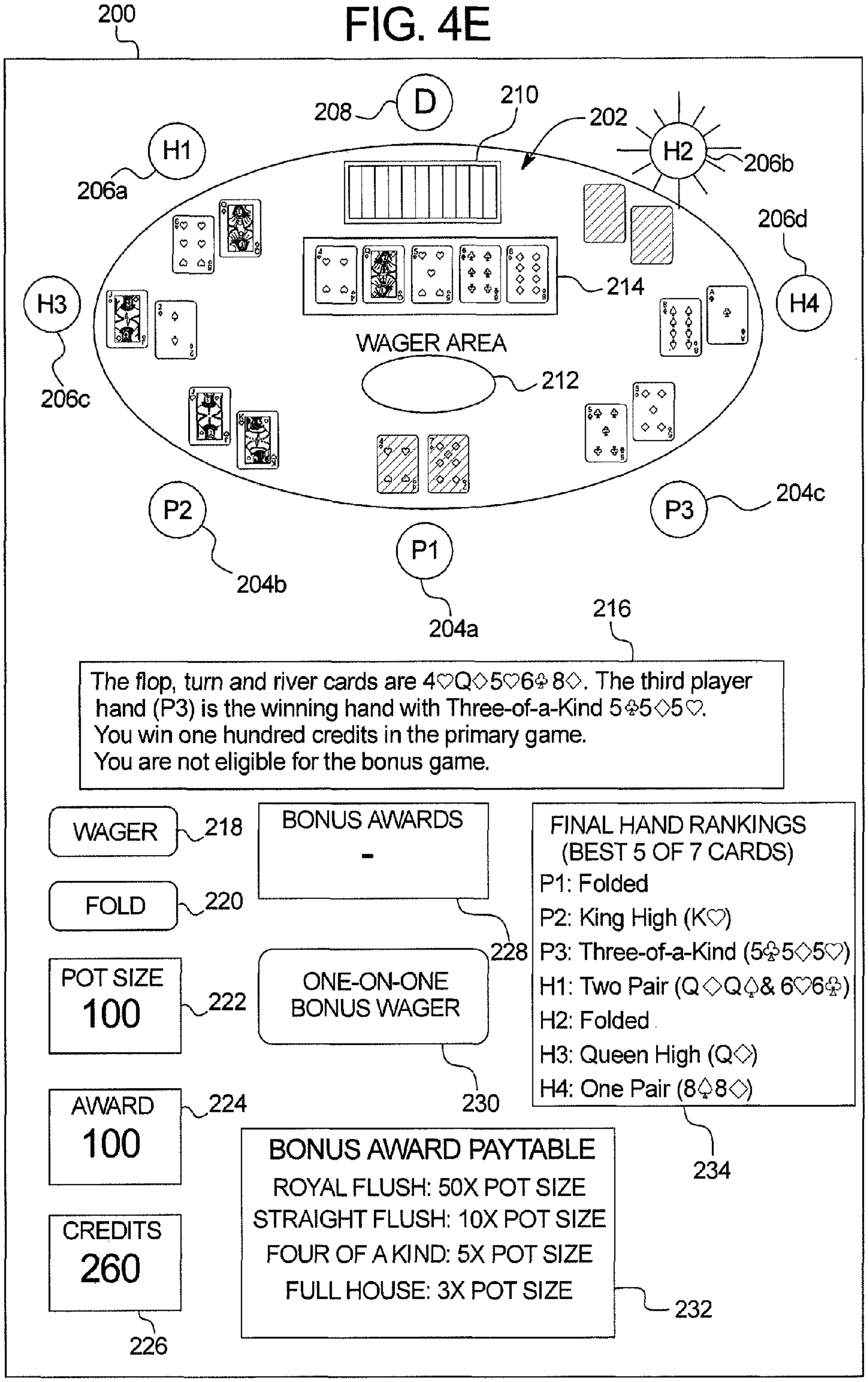

As shown in FIG. 4E, after the wagering has been completed for the three player hands 204a, 204b and 204c and the gaming device 10 and folded the corresponding number of house hands, the gaming device 10 reveals the values of the hole-cards in the house hands 206a, 206b, 206c and 206d. Also, the gaming device 10 contributes a number of credits to the pot equal to the value of the player's original wager multiplied by the number of active house hands 206a, 206c and 206d. In this example, there are three active house hands 206a, 206c and 206d and the initial player's wager was twenty credits. Therefore, the gaming device 10 contributes a total of sixty credits to the pot, as indicated by the pot size display 222. The total size of the pot (i.e., one-hundred credits) represents forty credits contributed by the player and sixty credits contributed by the gaming device 10. Accordingly, because there are more house hands than player hands, the gaming device 10 invariably contributes more to the pot than does the player. This seeming advantage to the player is offset by the fact that the house is able to player more hands than the player, thus having a higher probability of obtaining the highest ranking final hand.

In this example, the first house hand 206*a* includes the Six of Hearts (6♥) and the Queen of Hearts (Q♥), the second house hand 206*b* was already folded, the third house hand 206*c* includes the Jack of Hearts (J♥) and the Two of Spades (2♠), and the fourth house hand 206*d* includes the Eight of Spades (8♠) and the Ace of Clubs (A♣). Then, the gaming device 10 reveals the values of the five community cards 214. In this embodiment, unlike a traditional round of play of Texas Hold'em, there are no additional rounds of wagering when the Turn Cards, the Flop Card and the River Card are revealed. Accordingly, the gaming device 10 causes all five of the community cards to be revealed at the same time. However, it should be appreciated that in other embodiments, the five community cards 214 can be revealed one at a time, or in a sequence of three cards, one card, and one card to create suspense or excitement for the player. In other embodiments, additional rounds of wagering are allowed after the Flop Cards, the Turn Card, and the River Card are revealed, respectively. In these embodiments, the values of the cards in the house hands 206*a*, 206*b*, 206*c* and 206*d* are not revealed to the player until after all wagering has been completed.

As shown in FIG. 4E, the gaming device 10 causes the ranks of the final hands to be displayed on the hand rank display 234. As mentioned above, each final hand includes the best five card combination taken from the two hole-cards and the five community cards. In this example round of play of the game, the final hand rankings are as follows: second player hand 204*b*—King high (K♥Q♦8♦6♣5♥); third player hand 204*c*—Three-Of-A-Kind (5♣5♦5♥Q♦8♦); first house hand 206*a*—Two-Pair (Q♦Q♣6♥6♣8♦); third house hand 206*c*—Queen High (Q♦J♦8♦6♣5♥); and the fourth house hand 206*d*—One-Pair (8♣8♦A♣Q♦6♣). Accordingly, the third player hand 204*c* is the winning hand with Three-Of-A-Kind (i.e., 5♣5♦5♥), as further indicated by the message display 216. The player wins an award of one hundred credits, as indicated by the award display 224 and the message display 216. Also, the player credits are increased by one hundred credits to a total value of two-hundred sixty credits, as indicated by the credits display 226. However, because the rank of the player's winning hand was not one of the predetermined ranks (as indicated by the bonus award paytable display 232), the player is not eligible for the bonus game and does not receive an initial bonus award. This completes this round of play of the game.

Figure 5A:
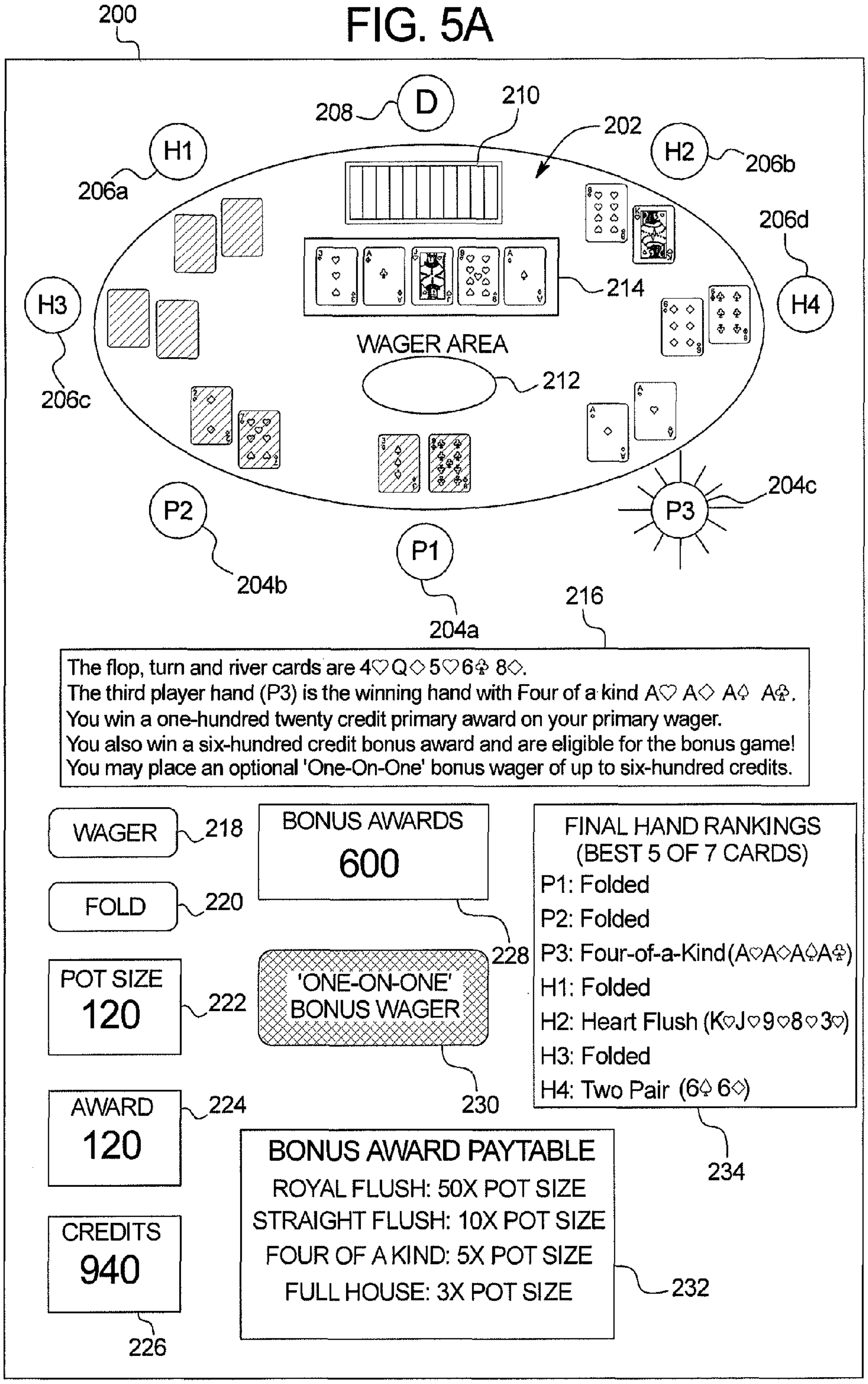
FIGS. 5A, and 5B, 5C are illustrations of screen displays for another round of the game, where the player winning hand is a predetermined hand and the player wins a bonus award.
Figure 5B:
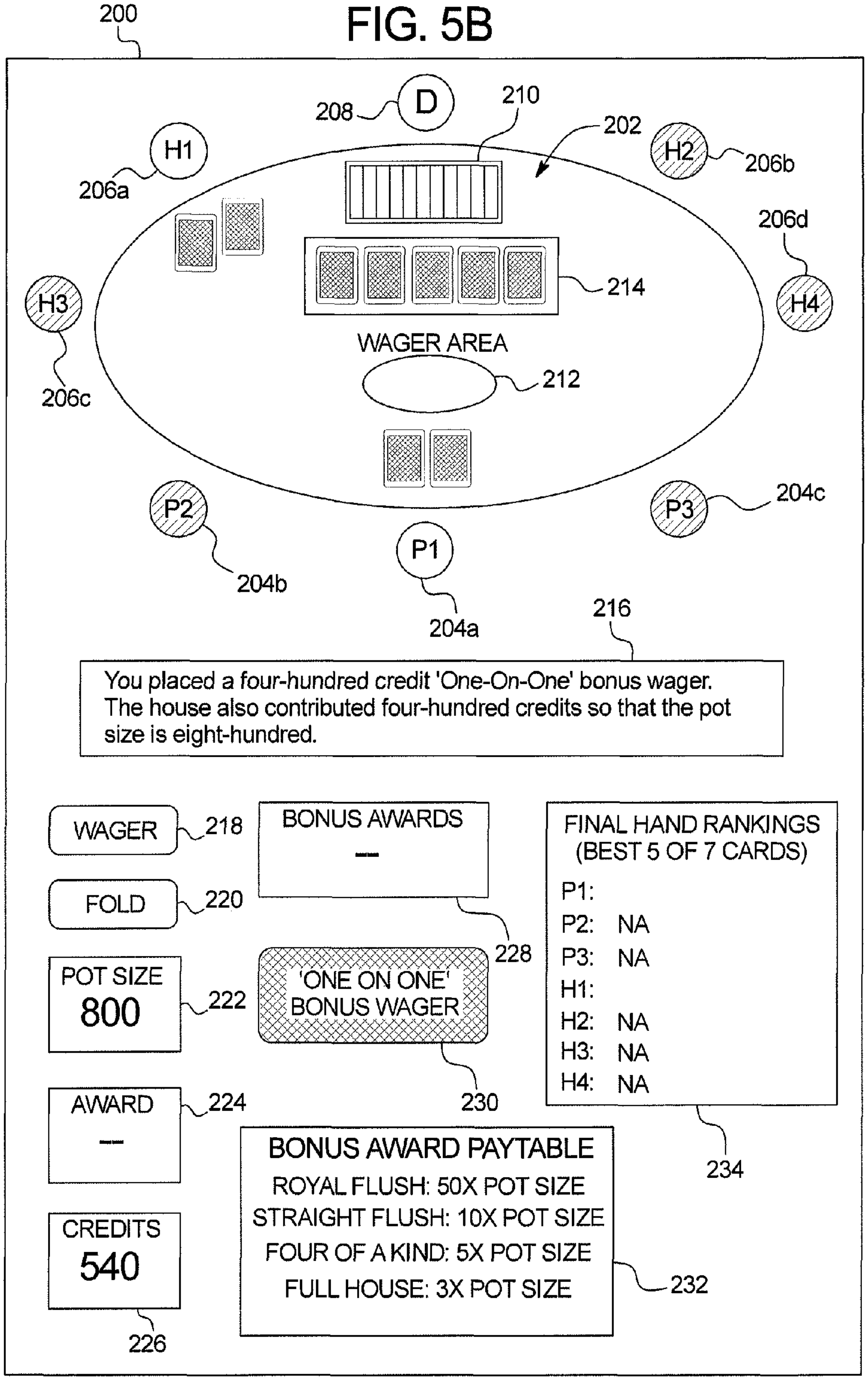
Figure 5C:
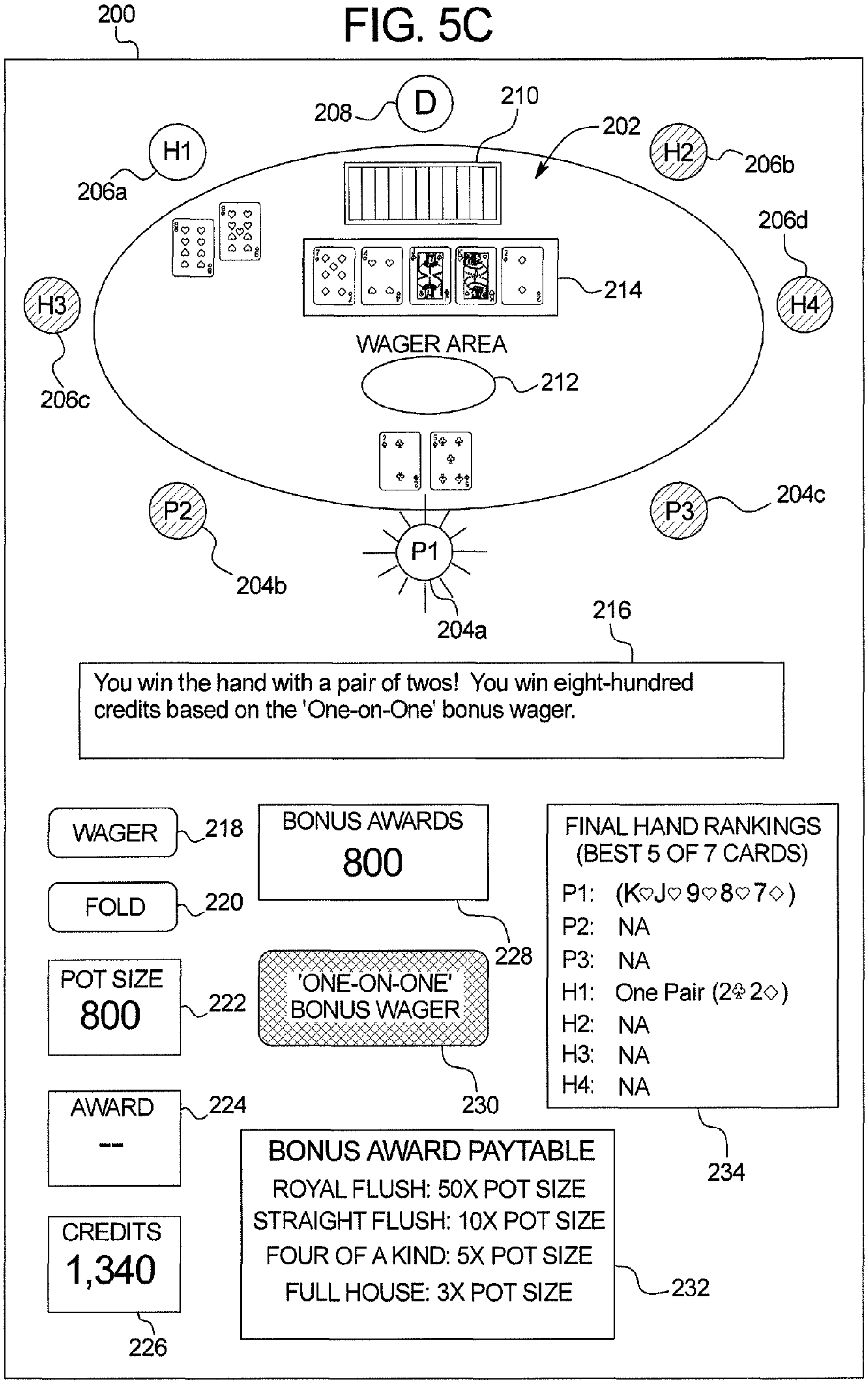

Referring to FIGS. 5A to 5C, an example round of play of the game is shown where the player wins the round of play and where player's winning hand is one of the predetermined ranking hands (i.e., Four-Of-A-Kind). Thus, in this example round of play of the game, the player wins an initial bonus award and is eligible to participate in the 'One-On-One Bonus Round.' FIG. 5A shows the stage of the round of play of the game after the player has made the wagers, folded hands, and after the cards in the house hands and the community cards have been revealed. More specifically, in this round of play, the player folded the first player hand 204*a* and the second player hand 204*b*, and wagered forty credits on the third player hand 204*c*. Also, the gaming device 10 caused the first house hand 206*a* and the third house hand 206*c* to be folded, and contributed eighty credits to the pot for the remaining active hands (i.e., the second house hand 206*b* and the fourth house hand 206*d*). Therefore, the value of the pot is one-hundred twenty, as indicated in the pot size display 222. The community cards 214 were dealt and are the Three of Hearts (3♥), the Ace of Clubs (A♣), the Jack of Hearts (J♥), the Nine of Hearts (9♥), and the Ace of Spades (A♠). The resultant player and house hands are as follows: the third player hand 204*c*—Four-Of-A-Kind (A♥A♦A♣A♠J♥); the second house hand 206*b*—Hearts-Flush (K♥J♥9♥8♥3♥); and the fourth house hand—One-Pair (A♣A♠6♦6♣J♥).

Because the player had the winning hand, the gaming device 10 provided the player with a primary award of one-hundred twenty credits. In addition, because the winning player hand 204*c* (A♥A♦A♣A♠J♥) is one of the plurality of predetermined hands (i.e., Four-Of-A-Kind), the gaming device 10 provides the player with a bonus award that is five-times the value of the pot. In particular, the bonus award is five-times the pot size of one-hundred twenty, or six hundred credits, as indicated in the bonus awards display 228. The gaming device 10 provides the one-hundred twenty credit primary award and the six-hundred credit bonus award to the player and updates the credits display 226 to a total of nine-hundred forty credits.

Referring to FIG. 5A, in this example play of the game, gaming device 10 enables the player to place an optional secondary wager or bonus wager up to the value of the bonus award, as indicated in the message display 216. Therefore, the player may place an optional secondary wager up to an amount of six-hundred credits on the secondary game. In one embodiment, the bonus game is initiated only after a secondary wager has been placed. In one embodiment, the secondary game is a heads-up or one-on-one poker game, where the player plays only one player hand against one house hand for the amount of the secondary wager. This bonus round is played in a similar fashion to the primary round of play, except that the player and house have only one hand each. Therefore, the player has more of an advantage than in the primary round because the player and the house have the same number of hands.

As shown in FIG. 5B, in the bonus round, the play area 202 reflects that the second player hand 204*b*, the third player hand 204*c*, the second house hand 206*b*, the third house hand 206*c*, and the fourth house hand 206*d* are not active (i.e., folded). However, it should be appreciated that the gaming device 10 may display to the player another gaming table or play area with only one player position and one dealer position. In this example play of the bonus round, the player wagers four hundred credits as a secondary wager, as indicated by the credits display 226 and by the activated bonus wager input 230. Likewise, the gaming device 10 contributes four hundred credits to match the size of the player's secondary or bonus wager. The pot size for the bonus round is a total of eight hundred credits, as indicated by the pot size display 222 and in the message display 216.

As shown in FIG. 5C, the gaming device 10 deals two hole-cards face-up to form the player hand 204*a* and the two hole-cards face-up to form the house hand 206*a*. In this example, the cards in the player hand 204*a* include the Two of Clubs (2♣) and the Five of Clubs (5♣), and the cards in the dealer hand 206*a* include the Eight of Hearts and the Nine of Hearts (8♥9♥). The gaming device 10 deals the five community cards 214. In this example, the five community cards 214 include the Seven of Diamonds (7♦), the Four of Hearts (4♥), the Jack of Clubs (J♣), the King of Hearts (K♥), and the Two of Diamonds (2♦). Therefore, the final hand rank for the player's hand 204*a* is One-Pair (i.e., 2♣2♦K♥J♣7♦), and the final rank for the house hand 206*a* is King-High (i.e., K♥J♣9♥8♥7♦). Accordingly, because the player hand 204*a* has a higher rank than the dealer hand 206*a*, the player wins this play of the bonus game. The gaming device 10 provides the player with an eight hundred credit bonus award and updates the player's total credits, as indicated by the message display 216 and the credits display 226. This completes this round of play of the primary game and the bonus game.

In another embodiment, the player and the dealer each receive the same number of hands. Such a game would offer only a small potential advantage to the casino based on the casino being able to make it's hand selection choice based upon knowledge of which hand(s) the player selected and which cards were no longer in the deck. In one embodiment, no bonus payouts or award are provided to the player. In one embodiment, the casino would win all ties. In one embodiment, the casino would charge a vig or commission on any player winnings. In one embodiment, the player would be required to place a side bet of a defined size relative to the player's main game wager(s).

Single Hand Selection Texas Hold'em Embodiment

In one embodiment, a modified game of Texas Hold'em is provided, to a certain extent, as described above. However, in this embodiment, the wagering scheme is different. In particular, in this embodiment, the player and the dealer or house are only able to choose one of the plurality of hands. The player makes a single wager and the gaming device contributes a matching amount to the pot. In an alternate embodiment, the player makes a single wager and if the player wins, the player receives an award based upon his wager. The gaming device deals a plurality of player hands and a plurality of house hands or dealer hands. In one embodiment, the number of player hands is three and the number of dealer hands is also three. However, it should be appreciated that any suitable number of hands may be dealt to the player and the house or gaming device opponent, and the number of hands may be different for the player and the dealer.

At the beginning of a round of play of the game, the player is required to place a single wager. Although, at this stage the player has not seen any of the three player hands and the wager is not yet associated with any of these hands. The gaming device reveals a first one of the player hands and the player decides whether to accept or reject this first hand. If the player accepts the first hand, this will be the hand that the player will have to use for the round of play of the game. In general, a player would like to accept a hand that they believe will give them the highest probability of obtaining a high ranking final hand. In general, a high pair such as an AA or a KK or high valued suited connectors (i.e., hole cards that are of the same suit and that could potentially be combined with other cards to form a straight) are considered to be very good starting hands. If the player rejects the first hand, the gaming device reveals the next player hand. In a similar fashion, the player has the option to accept or reject this second hand. This process repeats until the player either selects a hand to play or until the last player hand is revealed. By default, if the player has not selected a hand, then the last hand is automatically selected. Accordingly, the player gets to look at one hand at a time and decide whether or not a particular hand will be the one that the player uses for the round of play of the game.

After the player has selected the hand, the dealer selects a hand in the same manner. In this embodiment, the player and the dealer may end up passing over or giving up a relatively good starting hand and end up with a relatively poor hand by default. Although, in another embodiment, the dealer or house is able to look at all three hands before selecting the dealer hand. Therefore, the dealer would be able to always select the statistically best starting hand. In another embodiment, the dealer would not only be able to view all of the cards in the plurality of dealer hands prior to selecting a hand, but would also be able to view the cards in the player hands.

In one embodiment, if the player wagers on one of the first player hands, the gaming device revels the remaining unselected hands to the player such that the player is able to view what hands they could have selected. In one embodiment, if a player chooses to pass on a particular hand, the gaming device causes the discarded hand to be visually dimmed down on the display screen or otherwise visually or functionally deactivated.

In an alternative embodiment, the unselected hands (player's or player's and dealer's) remain in the game. If an unselected hand is the highest ranking hand for the round of play of the game, the pot is carried over for the next round of play. The player must continue to wager the same amount in subsequent rounds of play to vie for the carried over pot. In one embodiment, the pot is carried over without the player being required to wager on the next round.

In one embodiment, the gaming device reveals all of the player hands to the player prior to the player selecting the winning hand. Similarly, the dealer is able to view all the dealer hands before selecting a dealer hand for play. In one embodiment, the dealer can see the player's select hand and unselected hands before selecting a dealer hand for play. In this embodiment, the number of dealer hands is greater than the number of player hands. However, it should be appreciated that in other embodiments the number of player hands is the same as the number of dealer or house hands.

In one embodiment, where the pot may be carried over from one round of play to another round of play as described above, the casino or gaming establishment takes a percentage amount of any money held over from a first round of play of the game to a second round of play of the game.

In one embodiment, the poker game may be played at an actual gaming table with a live dealer. In this embodiment, the dealer would simply hold whichever hand has the highest relative two card ranking relative to a list of ranked hands, irrespective of actual player cards and selected player hand. In other table game embodiments, the gaming table includes a suitable card reading and tracking technology, as discussed above. In these embodiments, the gaming system is able to determine the values of the cards in the dealer hands and make an automatic determination as to which hand the dealer should select. This would largely eliminate the possibility for dealer error and would help to facilitate the pace of the game. It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A method of operating a gaming device, said method comprising:

(a) enabling a player to use at least one input device to designate a wager amount for a play of a single card game;

(b) causing a display device to display a plurality of cards face-down to form a plurality of two-card player hands and a plurality of two-card house hands from a virtual deck of playing cards for the play of the card game, wherein the play of the single card game includes each of the plurality of two-card player and two-card house hands;

(c) sequentially for each two-card player hand:

(i) revealing the cards in said two-card player hand;

(ii) if said two-card player hand is not a final player hand or if the player has already placed a wager on a previous two-card player hand, enabling the player to either:

(A) place a wager of the designated wager amount on said two-card player hand, or (B) fold said two-card player hand;

(iii) if said two-card player hand is the final player hand and the player has not already placed a wager on a previous two-card player hand, requiring the player to place a wager of the designated wager amount on said two-card player hand; and (iv) for each two-card player hand folded by the player, folding one of the two-card house hands, (d) if the player places the wager of the designated wager amount on each and every one of the plurality of two-card player hands formed, cause the gaming device to play each and every one of the two-card house hands;

(e) displaying five community cards face-up;

(f) determining the rank of each wagered on two-card player hand and each non-folded two-card house hand by:

(i) forming, for each of said two-card player hands, a final player hand including the highest ranking five card poker hand from the two cards in each said respective two-card player hand and the five community cards; and (ii) forming, for each of said non-folded two-card house hands, a final house hand including the highest ranking five card poker hand from the two cards in each said respective two-card house hand and the five community cards; and (g) providing a primary award to the player if the rank of at least one of the wagered on final player hands is greater than the rank of all of the non-folded final house hands, the primary award based, at least in part, on the total value of the placed wagers.

2. The method of claim 1, which includes enabling the player to use the at least one input device to place an optional bonus wager.

3. The method of claim 2, which includes providing a bonus award to the player if the player placed the optional secondary wager and if the rank of one of the wagered on final player hands is one of a plurality of designated ranks.

4. The method of claim 1, which includes providing a bonus award to the player if the rank of at least one of the wagered on final player hands is greater than the rank of all of the final house hands, and if the rank of said wagered on final player hand is one of a plurality of designated ranks.

5. The method of claim 4, wherein the plurality of designated ranks include: a Full House; a Four-Of-A-Kind; a Straight Flush; and a Royal Straight Flush.

6. The method of claim 5, wherein the bonus award is based on the value of the primary award.

7. The method of claim 5, wherein the bonus award is based on the value of the designated wager amount.

8. The method of claim 5, wherein the bonus award is based on the rank of the wagered on final player hand.

9. The method of claim 4, further comprising:

(a) enabling a player to place a secondary wager up to the value of any provided bonus award;

(b) causing a display device to display:

(i) cards face-up to the player to form a two-card player hand, and (ii) cards face-up to form a two-card house hand;

(c) displaying five community cards face-up;

(d) determining the rank of a final player hand and a final house hand by:

(i) forming the highest ranking five card poker hand from the two cards in the two-card player hand and the five community cards; and (ii) forming the highest ranking five card poker hand from the two cards in the two-card house hand and the five community cards; and (e) providing a secondary award to the player if the rank of the final player hand is greater than the rank of the final house hand.

10. The method of claim 9, wherein the value of the secondary award is the same as the value of the secondary wager.

11. The method of claim 1, wherein the number of two-card house hands is greater than the number of two-card player hands.

12. The method of claim 11, wherein the number of two-card house hands is four and the number of two-card player hands is three.

13. The method of claim 1, wherein the number of two-card house hands is equal to the number of two-card player hands.

14. The method of claim 1, which includes providing the primary award to the player if the rank of at least one of the wagered on final player hands is greater than the rank of some of the final house hands, the primary award based, at least in part, on the number of final house hands ranking below the wagered on final player hands.

15. The method of claim 1, which includes providing a bonus award to the player if the rank of at least one of the final player hands meets a predetermined criteria, where the bonus award is based on a paytable.

16. The method of claim 1, wherein folding one of the two-card house hands includes selecting and folding one of the two-card house hands having a rank closest to the rank of the most recently folded two-card player hand.

17. The method of claim 1, wherein folding one of the two-card house hands includes randomly selecting and folding one of the two-card house hands.

18. The method of claim 1, wherein folding one of the two-card house hands includes selecting and folding the lowest ranking two-card house hand.

19. The method of claim 1, which is provided through a data network.

20. The method of claim 19, wherein the data network is an internet.

21. A gaming device comprising:

at least one input device;

at least one display device;

at least one processor; and at least one memory device which stores a plurality of instructions, which when executed by the at least one processor, cause the at least one processor to operate with the at least one input device and the at least one display device, for a play of a single poker game, to:

(a) enable the player to place a primary wager on said play of the poker game;

(b) display a plurality of two-card player hands face-down and a plurality of two-card dealer hands face-down from a virtual deck of playing cards, wherein the play of the single poker game includes each of the plurality of two-card player and two-card house hands;

(c) select one of the two-card player hands by enabling the player to select one of the plurality of two-card player hands by displaying one of the two-card player hands and allowing the player to accept or reject said hand, for each of the plurality of two-card player hands until the player accepts one of the player hands, a player hand being automatically selected if the player rejected all of the previous player hands;

(d) select one of the plurality of two-card dealer hands by displaying one of the two-card dealer hands and accepting or rejecting said hand, for each of the plurality of two-card dealer hands until one of the plurality of dealer hands has been accepted, a dealer hand being automatically selected if all of the previous two-card dealer hands are rejected, wherein for each and every one of the two-card player hands is selected, one of the two-card dealer hands is also selected;

(e) for each two-card player hand folded by the player, folding one of the two-card dealer hands;

(f) display five community cards face-up;

(g) determine the rank of the selected two-card player hand and the selected two-card dealer hand by:

(i) forming a final player hand including the highest ranking five card poker hand from the two cards in said selected player hand and the five community cards; and (ii) forming a final dealer hand including the highest ranking five card poker hand from the two cards in said selected dealer hand and the five community cards; and (h) provide a primary award to the player if the rank of the final player hand is greater than the rank of the final dealer hand.

22. The gaming device of claim 21, wherein when executed by the at least one processor, the plurality of instructions cause the at least one processor to provide a bonus award to the player if the rank of the final player hand is greater than the rank of the final dealer hand and is one of a plurality of predetermined ranks.

23. The gaming device of claim 22, wherein the plurality of predetermined ranks include: a Full House; Four-Of-A-Kind; a Straight Flush; and a Royal Straight Flush.

24. The gaming device of claim 23, wherein the bonus award is based on the value of the primary wager.

25. The gaming device of claim 23, wherein the bonus award is based on the relative probability of achieving a hand having one of the plurality of predetermined ranks.

26. The gaming device of claim 22, wherein when executed by the at least one processor, the plurality of instructions cause the at least one processor to:

enable the player to place a secondary wager up to the value of any provided bonus award;

display cards to the player face-up to form a two-card player hand and display cards face-up to form a two-card dealer hand;

display five community cards face-up;

determine the rank of the two-card player hand and the two-card dealer hand by:

forming the highest ranking five card poker hand from the two-card player hand and the five community cards; and forming the highest ranking five card poker hand from the two-card dealer hand and the five community cards; and provide a secondary award to the player if the rank of the two-card player hand is greater than the rank of the two-card dealer hand.

27. The gaming device of claim 26, wherein the value of the secondary award is the same as the value of the secondary wager.

28. The gaming device of claim 21, wherein the number of two-card dealer hands is four and the number of two-card player hands is three.

29. The gaming device of claim 21, wherein the number of two-card dealer hands is equal to the number of two-card player hands.

30. The gaming device of claim 21, wherein when executed by the at least one processor, the plurality of instructions cause the at least one processor to:

provide the primary award to the player if the rank of at least one of the wagered on final player hands is greater than the rank of some of the final dealer hands, the primary award based, at least in part, on the number of non-folded final dealer hands ranking below the wagered on final player hands.

31. The gaming device of claim 21, wherein when executed by the at least one processor, the plurality of instructions cause the at least one processor to:

provide a bonus award to the player if the rank of at least one of the final player hands meets a predetermined criteria, where the bonus award is based on a paytable.

32. The gaming device of claim 21, wherein when executed by the at least one processor, the plurality of instructions cause the at least one processor to:

select from the non-folded two-card dealer hands the hand having a rank closest to a rank of the most recently folded two-card player hand, and fold the selected two-card dealer hand.

33. The gaming device of claim 21, wherein when executed by the at least one processor, the plurality of instructions cause the at least one processor to:

randomly select one two-card dealer hand from the non-folded two-card dealer hands, and fold said randomly selected two-card dealer hand when the player folds one of the two-card player hands.

34. The gaming device of claim 21, wherein when executed by the at least one processor, the plurality of instructions cause the at least one processor to:

fold the lowest ranking non-folded two-card dealer hand when the player folds one of the two-card player hands.

35. A gaming system comprising:

at least one input device;

at least one display device;

at least one processor; and at least one memory device which stores a plurality of instructions, which when executed by the at least one processor, cause the at least one processor to operate with the at least one input device and the at least one display device, for a play of a single poker game, to:

(a) enable the player to place a primary wager on the play of the poker game;

(b) display a plurality of two-card player hands and a plurality of two-card dealer hands from a virtual deck of playing cards, wherein the play of the single poker game includes each of the plurality of two-card player and two-card dealer hands;

(c) enable a player to select one of the plurality of two-card player hands by displaying one of the two-card player hands and allowing the player to accept or reject said hand, for each of the plurality of two-card player hands until the player accepts a two-card player hand;

(d) select one of the plurality of two-card dealer hands by displaying one of the two-card dealer hands and accepting or rejecting said hand, for each of the plurality of two-card dealer hands until one of the plurality of two-card dealer hands has been accepted, wherein for each and every one of the two-card player hands selected, one of the two-card dealer hands is selected;

(e) for each two-card player hand folded by the player, folding one of the two-card dealer hands;

(f) display five community cards;

(g) determine the rank of the selected two-card player hand and the selected two-card dealer hand by:

(i) forming a final player hand including the highest ranking five card poker hand from the two cards in the two-card player hand and the five community cards; and (ii) forming a final dealer hand including the highest ranking five card poker hand from the two cards in the two-card dealer hand and the five community cards; and (h) provide a primary award to the player if the rank of the final player hand is greater than the rank of the final dealer hand.

36. The gaming system of claim 35, wherein when executed by the at least one processor, the plurality of instructions cause the at least one processor to display five community cards by:

displaying three community cards face-up, and enabling the player to place another optional wager;

displaying a fourth card community card face-up and enabling the player to place another optional wager; and displaying a fifth card community card face-up and enabling the player to place another optional wager.

37. A method of operating a gaming device, said method comprising:

(a) requiring a player to use an input device to place an initial ante wager for a play of a single card game;

(b) causing at least one display device to display the card game;

(c) causing the at least one display device to display cards face-down to form a plurality of two-card player hands and a plurality of two-card house hands from a virtual deck of playing cards, wherein the play of the single card game includes each of the plurality of two-card player and two-card house hands;

(d) sequentially for each player hand:

(i) revealing the cards in said two-card player hand;

(ii) enabling the player to either place a wager on the two-card player hand or fold the two-card player hand; and (iii) if the player folds the two-card player hand, folding one of the two-card house hands;

(e) if each and every one of the two-card player hands have been wagered on, cause the gaming device to play each and every one of the two-card house hands; and (f) for any two-card player hands that have been wagered on:

(i) displaying five community cards face-up;

(ii) sequentially for each wagered on two-card player hand and each wagered on two-card house hand, determining the rank of said hand by:

(A) forming a final player hand including the highest ranking five card poker hand from the two cards in the two-card player hand and the five community cards; and (B) forming a final house hand including the highest ranking five card poker hand from the two cards in the two-card house hand and the five community cards; and (iii) providing a primary award to the player if the rank of at least one of the wagered on final player hands is greater than the rank of all of the final house hands, the primary award based on the total value of the placed wagers and the value of the initial ante wager.

38. The method of operating a gaming device according to claim 37, wherein the initial ante wager and any subsequent wagers by the player are added to a pot.

39. The method of operating a gaming device according to claim 38, further including increasing the pot, for each wagered on two-card player hand, by the amount of the wager for the respective two-card player hand.

40. The method of operating a gaming device according to claim 39, wherein the primary award is the total value of the pot.

* * * * *